(12) United States Patent
Hansaki

(10) Patent No.: US 8,456,693 B2
(45) Date of Patent: Jun. 4, 2013

(54) IMAGE-PROCESSING APPARATUS AND IMAGE-PROCESSING METHOD

(75) Inventor: Tomoyuki Hansaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 529 days.

(21) Appl. No.: 12/813,345

(22) Filed: Jun. 10, 2010

(65) Prior Publication Data
US 2011/0013205 A1  Jan. 20, 2011

(30) Foreign Application Priority Data

Jul. 15, 2009  (JP) ................................. 2009-167263

(51) Int. Cl.
*G06K 15/10* (2006.01)
*G03F 3/08* (2006.01)

(52) U.S. Cl.
USPC .............. 358/1.8; 358/518; 358/2.1; 358/1.9; 358/3.03; 358/504; 347/19

(58) Field of Classification Search
USPC ................. 358/518, 2.1, 1.9, 3.03, 3.05, 504, 358/1.8; 347/19; 382/300
See application file for complete search history.

(56) References Cited

U.S. PATENT DOCUMENTS

| | | | | |
|---|---|---|---|---|
| 5,363,318 A * | 11/1994 | McCauley | ........................ | 702/85 |
| 5,621,546 A * | 4/1997 | Klassen et al. | ................. | 358/536 |
| 5,732,162 A * | 3/1998 | Curry | ............................ | 382/294 |
| 5,748,336 A * | 5/1998 | Kakutani | ...................... | 382/252 |
| 5,973,803 A * | 10/1999 | Cheung et al. | ................ | 358/534 |
| 6,164,745 A * | 12/2000 | Nagoshi et al. | ................. | 347/15 |
| 6,999,201 B1 * | 2/2006 | Shimizu | ....................... | 358/3.04 |
| 7,327,491 B2 | 2/2008 | Kato et al. | | |
| 7,859,723 B2 * | 12/2010 | Yamada et al. | ............... | 358/3.05 |
| 7,881,372 B2 * | 2/2011 | Ishikawa | .................. | 375/240.03 |
| 8,130,415 B2 * | 3/2012 | Yanai et al. | ..................... | 358/2.1 |
| 8,169,665 B2 * | 5/2012 | Wong et al. | ................... | 358/3.04 |
| 2003/0038953 A1 * | 2/2003 | Damera-Venkata | ........... | 358/1.9 |
| 2003/0081257 A1 * | 5/2003 | Toyoda et al. | ................ | 358/3.13 |
| 2004/0051905 A1 * | 3/2004 | Yamada et al. | ............... | 358/3.03 |
| 2004/0184056 A1 * | 9/2004 | Ikeda | .............................. | 358/1.9 |
| 2008/0316554 A1 | 12/2008 | Yanai et al. | | |

FOREIGN PATENT DOCUMENTS

| JP | 60-107975 | 6/1985 |
|---|---|---|
| JP | 8-279920 | 10/1996 |
| JP | 2003-116015 | 4/2003 |
| JP | 2008-188805 | 8/2008 |

* cited by examiner

*Primary Examiner* — Dennis Dicker
(74) *Attorney, Agent, or Firm* — Fitzpatrick, Cella, Harper & Scinto

(57) ABSTRACT

The present invention provides an image-processing apparatus, including: a corrected value calculating unit configured to calculate corrected values by adding error values diffused from a pixel neighboring a pixel currently being processed respectively to a plurality of input values corresponding to the pixel currently being processed; a total value calculating unit configured to calculate a total value of all corrected values; a quantizing unit configured to quantize the total value; a distributing unit configured to calculate a plurality of output values corresponding to the plurality of input values by distributing the quantized value according to a ratio between each of the corrected values and the total value; and an adding unit configured to calculate respective difference values between the plurality of output values and the plurality of corrected values, and to add the calculated difference values to corrected values.

11 Claims, 10 Drawing Sheets

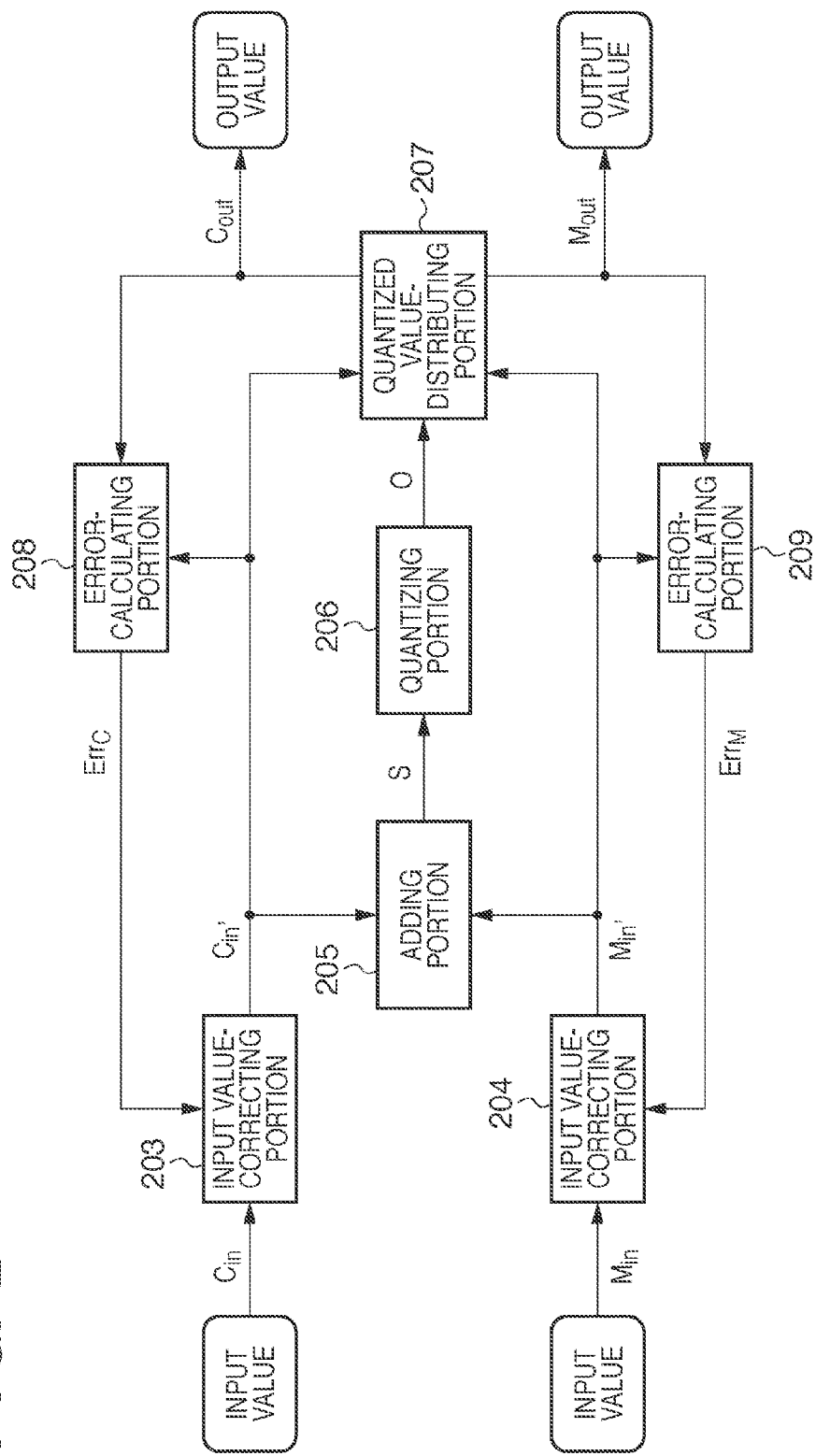
F I G. 2

IMAGE-PROCESSING APPARATUS AND IMAGE-PROCESSING METHOD

BACKGROUND OF THE INVENTION

1. Field of the Invention

The present invention relates to an image-processing apparatus and an image-processing method for generating record data used in an image-forming apparatus that forms an image by performing recording scans a plurality of times on the same image region on a recording medium.

2. Description of the Related Art

An inkjet printer is known as an example of an image-forming apparatus that forms an image by performing recording scans a plurality of times on the same image region on a recording medium. In an inkjet printer, an image is printed by discharging ink droplets from a recording head and landing them on a recording medium while reciprocally moving the recording head in a main-scanning direction (performing a recording scan) and transporting the recording medium in a sub-scanning direction. An inkjet printer visually expresses a wide variety of colors by forming several colors of very small dots in one region. The dot arrangement is determined through a quantization process performed by a driver. The dot arrangement significantly affects the image quality, and, thus, various techniques have been conventionally proposed in order to improve the arrangement.

Japanese Patent Laid-Open No. 8-279920 (Patent Document 1) discloses a technique for uniformly distributing dots by performing quantization with coordination between different colors. In this technique, the quantization process is performed by comparing the sum of input values and a threshold value. For example, in the case where blue is expressed by selecting cyan and magenta as different colors, if cyan and magenta are subjected to error diffusion independently of each other, a portion may be formed in which dots are arranged too close to or too away from each other, and the pattern may become visually uncomfortable (reference numeral 901 in FIG. 9). However, if the error diffusion is performed in a coordinated manner, a uniform dot arrangement is obtained in which cyan dots and magenta dots are dispersed from each other, and a visually preferable result is obtained (reference numeral 902 in FIG. 9).

Furthermore, Japanese Patent Laid-Open No. 60-107975 (Patent Document 2) uses a multi-pass recording method in which recording scans (overprint operations) are performed a plurality of times in the same region, because, when an image is printed, non-uniformity occurs in the orientation, the size, the dot landing position, and the like of ink droplets due to errors caused by physical factors such as the properties of each nozzle, errors in the paper-transporting amount, differences in the movement amount of the recording head, and the like. According to this method, the above-described non-uniformity of dots is evened out, and the image quality can be improved. It is known that, if dots on record data are arranged so as to be dispersed from each other between recording scans at that time, deterioration in the image quality due to non-uniformity of the dots is actually further suppressed on a paper face.

Here, as described above, in one region of an image, an inkjet printer performs image formation using a plurality of colors, or by performing recording scans a plurality of times using one color, and, in many cases, dots are preferably arranged so as to be dispersed from each other between colors or between recording scans. The reason for this is as follows: in the case where non-uniformity occurs in the orientation, the size, the dot landing position, and the like of ink droplets, if ink dots placed in one region are overlapped on each other, or close to each other but not overlapped, a color change or a darkness change on a paper face varies, and, even if dots are not overlapped on each other, darkness non-uniformity tends to visually appear when dots are arranged too close to each other.

A color change or a darkness change, which is visually uncomfortable, can be suppressed by generating data in advance in which dots are arranged so as to be dispersed from each other, thereby preventing the dots from being overlapped on each other or being too close to each other on a paper face. In particular, in a highlight portion with a low darkness, a color change or a darkness change is visually conspicuous, and, thus, dots are preferably dispersed in the highlight portion.

Furthermore, as another technique, Japanese Patent Laid-Open No. 2003-116015 (Patent Document 3) discloses a technique for obtaining quantized output values using a table. Furthermore, Japanese Patent Laid-Open No. 2008-188805 (Patent Document 4) discloses a technique for dispersing dots by obtaining frequency components of an image, and letting the components pass through a low-pass filter.

However, it is difficult to apply the techniques disclosed in Patent Documents 1 to 4 to any number of colors or any number of recording scans. If the number of colors or the number of recording scans increases, in conditional branch methods, branches for determining output values are complicated, and, thus, the control circuit is complicated. Furthermore, in table methods, the table data size increases, and, thus, a large memory is necessary, and the cost increases.

SUMMARY OF THE INVENTION

The present invention was arrived at in order to solve the above-described problems, and it is an object thereof to provide an image-processing apparatus and an image-processing method that can record a high-quality recording image at a higher speed with a simple configuration, regardless of the number of colors and the number of recording scans.

According to one aspect of the present invention, there is provided an image-processing apparatus, comprising: a corrected value calculating unit configured to calculate corrected values by adding error values diffused from a pixel neighboring a pixel currently being processed respectively to a plurality of input values corresponding to the pixel currently being processed; a total value calculating unit configured to calculate a total value of all corrected values calculated by the corrected value calculating unit; a quantizing unit configured to quantize the total value calculated by the total value calculating unit; a distributing unit configured to calculate a plurality of output values corresponding to the plurality of input values by distributing the quantized value quantized by the quantizing unit according to a ratio between each of the corrected values calculated by the corrected value calculating unit and the total value calculated by the total value calculating unit; and an adding unit configured to calculate respective difference values between the plurality of output values calculated by the distributing unit and the plurality of corrected values calculated by the corrected value calculating unit, and to add the calculated difference values to corrected values calculated by the corrected value calculating unit.

According to another aspect of the present invention, there is provided an image-processing method in an image-processing apparatus, comprising: a corrected value calculating step, in which a corrected value calculating unit provided in the image-processing apparatus calculates corrected values by adding error values diffused from a pixel neighboring a pixel currently being processed respectively to a plurality of input values corresponding to the pixel currently being processed; a total value calculating step, in which a total value calculating unit provided in the image-processing apparatus calculates a total value of all corrected values calculated in the corrected value calculating step; a quantizing step, in which a quantizing unit provided in the image-processing apparatus quantizes the total value calculated in the total value calculating step; a distributing step, in which a distributing unit provided in the image-processing apparatus calculates a plurality of output values corresponding to the plurality of input values by distributing the quantized value quantized in the quantizing step according to a ratio between each of the corrected values calculated in the corrected value calculating step and the total value calculated in the total value calculating step; and an adding step, in which an adding unit provided in the image-processing apparatus calculates respective difference values between the plurality of output values calculated in the distributing step and the plurality of corrected values calculated in the corrected value calculating step, and adds the calculated difference values to corrected values calculated in the corrected value calculating step.

According to another aspect of the present invention, there is provided an image-processing apparatus that quantizes input image data represented by individual color component values in N gradations into data represented by individual color component values in M gradations, where M is smaller than N, and distributes an error value of the individual color components generated at a time of quantization to unquantized pixel positions, comprising: a correcting unit configured to correct individual color component values of a pixel currently being processed by adding a quantization error distributed to the individual color components of the position of the pixel currently being processed to the individual color component values constituting the data of the pixel currently being processed; a first quantizing unit configured to independently quantize, to M gradations, individual color components that are set to be independently quantized in the pixel currently being processed after correction by the correcting unit; a second quantizing unit configured to calculate a total of color component values of two or more color components that are set to be quantized in a coordinated manner in the pixel currently being processed after correction by the correcting unit, and to quantize the calculated total to the number of gradations determined depending on the number of individual color components that are set to be quantized in a coordinated manner and the number of gradations M; a dividing unit configured to divide a value indicated by a result of the quantization performed by the second quantizing unit, in accordance with a ratio of the individual color component values that are set to be quantized in a coordinated manner, as quantized values of the individual color component values that are set to be quantized in a coordinated manner; and a distributing unit configured to distribute differences between a quantized value of the individual color components set to be independently quantized by the first quantizing unit and quantized values of the individual color components obtained by the division by the dividing unit, and unquantized values thereof, to unquantized pixel positions as quantization errors of the individual color components in the pixel currently being processed.

According to another aspect of the present invention, there is provided an image-processing apparatus that quantizes input image data represented by individual color component values in N gradations into data represented by individual color component values in M gradations, where M is smaller than N, and distributes an error value of the individual color components generated at a time of quantization to unquantized pixel positions, comprising: a correcting unit configured to correct individual color component values of a pixel currently being processed by adding a quantization error distributed to the individual color components of the position of the pixel currently being processed to the individual color component values constituting the data of the pixel currently being processed; a first quantizing unit configured to calculate a total of respective color component values of two or more predetermined color components in the pixel currently being processed after correction by the correcting unit, and to quantize the calculated total to the number of gradations determined depending on the number of individual color components that are set to be quantized in a coordinated manner and the number of gradations M; a second quantizing unit configured to independently quantize, to M gradations, color components that are the same as the color components set to be quantized in a coordinated manner in the pixel currently being processed after correction by the correcting unit; a third quantizing unit configured to independently quantize, to M gradations, a color component excluding the color components quantized by the second quantizing unit in the pixel currently being processed after correction by the correcting unit; a dividing unit configured to perform division to provide color component values of the color components that are set to be quantized in a coordinated manner, based on a ratio between a maximum value that can be taken by the color component values, and a total of a value indicated by a result of the quantization performed by the first quantizing unit and a value indicated by a result of the quantization performed by the second quantizing unit; and a distributing unit configured to distribute differences between a quantized value of the individual color component set to be independently quantized by the third quantizing unit and quantized values of the individual color components obtained by the division by the dividing unit, and unquantized values thereof, to unquantized pixel positions as quantization errors of the individual color components in the pixel currently being processed.

According to another aspect of the present invention, there is provided an image-processing apparatus that quantizes input image data having first image data that is to be quantized and second image data that is obtained by dividing a signal value of the first image data into a plurality of signal values, and represented by individual color component values in N gradations, into data represented by individual color component values in M gradations, where M is smaller than N, and distributes an error value of the individual color components generated at a time of quantization to unquantized pixel positions, comprising: a first calculating unit configured to calculate a corrected value for each pixel through addition of an error caused by a quantization process performed prior to that on a pixel currently being processed of the first image data; a second calculating unit configured to calculate corrected values, by adding all errors caused by a quantization process performed prior to that on a pixel currently being processed of the second image data, to pixel values of the pixel currently being processed; a third calculating unit configured to calculate a quantized value for each pixel based on the corrected values calculated by the second calculating unit; and a distributing unit configured to distribute the quantized value calculated by the third calculating unit to recording scans according to a ratio of a corrected value calculated by the first calculating unit with respect to a total of corrected values calculated by the first calculating unit.

According to the present invention, it is possible to record a high-quality recording image at a higher speed with a simple configuration, regardless of the number of colors and the number of recording scans.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a diagram showing a configuration for performing quantization of cyan and magenta.

DESCRIPTION OF THE EMBODIMENTS

Hereinafter, embodiments of the present invention will be described in detail with reference to the appended drawings. The embodiments described below are an example of means for realizing the present invention, and the present invention can be applied to those obtained by modifying or changing the following embodiments within a range not departing from a gist thereof.

First Embodiment

In this embodiment, a configuration will be described in which a host computer 101 that is a general-purpose computer functions as an image-processing apparatus according to the present invention, and a printer 102 that is an inkjet printer functions as an image-forming apparatus. It is assumed that the inkjet printer uses CMYK colors, and quantization (ternarization) to which the present invention is applied is performed on cyan and magenta. An independent quantization for each color is performed on yellow and black as in conventional examples. Here, the printer 102 may have the function of an image-processing apparatus.

Figure 1:
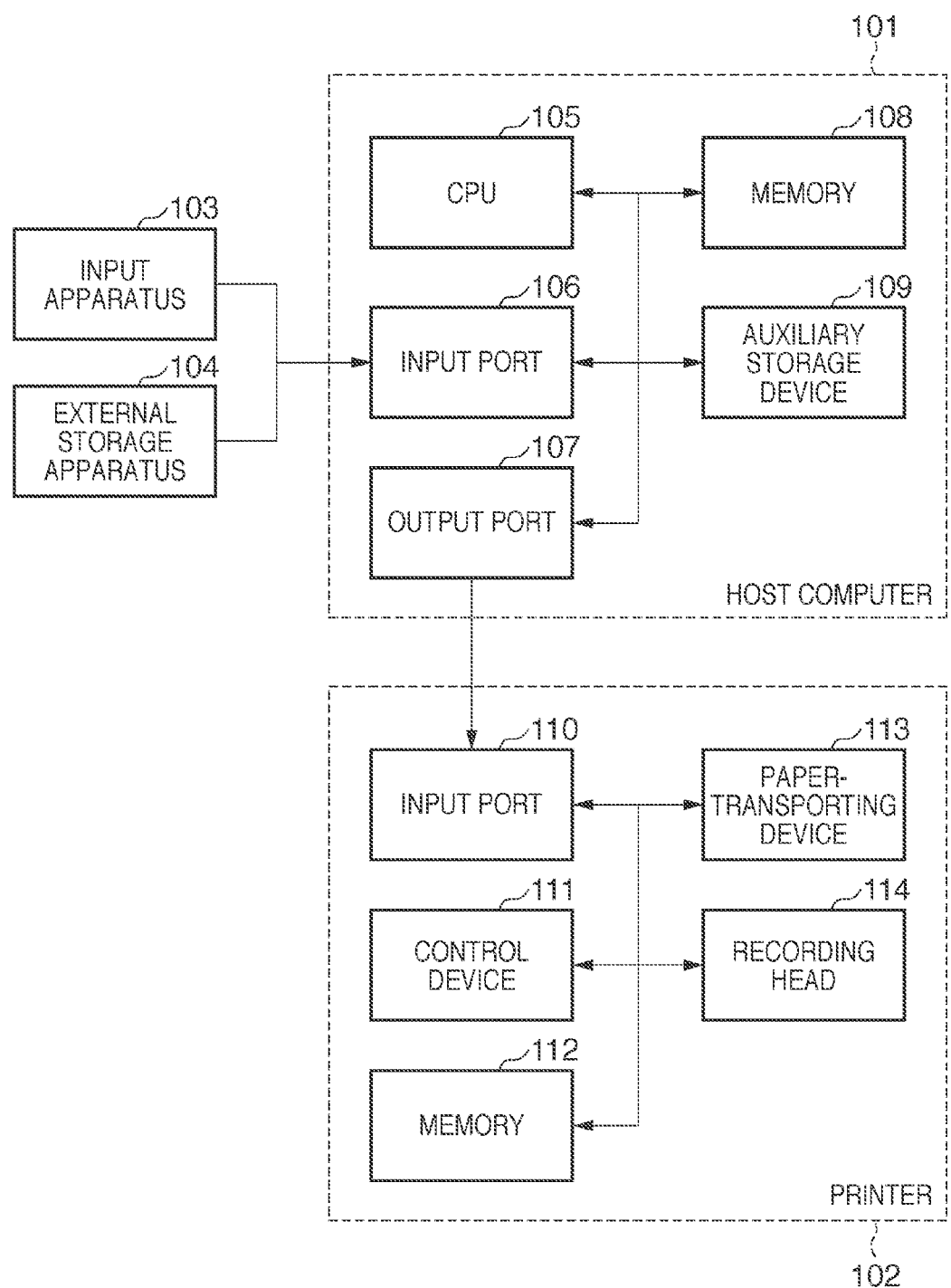
FIG. 1 is a diagram showing a configuration for performing printing with an inkjet printer.

FIG. 1 shows a configuration necessary for performing printing using a multi-pass method. The host computer 101 is an apparatus functioning as an image-processing apparatus that quantizes input image data represented by an individual color component value in N gradations into data represented by the individual color component value in M gradations, where M is smaller than N, and distributes an error value of the individual color component generated at the time of quantization to unquantized pixel positions. Furthermore, the host computer 101 is provided with a CPU 105, an input port 106 (for Ethernet (registered trademark), USB, etc.), an output port 107, a memory 108, and an auxiliary storage device 109. An input apparatus 103 such as a scanner or a digital camera or an external storage apparatus 104 such as a CD-ROM drive or a memory card reader is connected to the input port 106 in the host computer 101, and the printer 102 is connected to the output port 107. Furthermore, the printer 102 is provided with an input port 110 (for USB, Ethernet (registered trademark), etc.) that receives print data and control information, a control device 111 that internally controls the printer, a memory 112 that stores print data, internal settings, and the like, a paper-transporting device 113, and a recording head 114 that has nozzles for discharging ink onto a recording medium.

The CPU 105 of the host computer 101 is provided with input value-correcting portions 203 and 204 that correct input values Cin, Min of input image data in accordance with errors ErrC, ErrM caused by quantization, an adding portion 205 that obtains a sum total S of the corrected values Cin', Min', a quantizing portion 206 that obtains a quantized value O for the sum total S of the corrected values Cin', Min', error-calculating portions 208 and 209 that obtain errors ErrC, ErrM caused by the quantization (including an error buffer), and a quantized value-distributing portion 207 that distributes the quantized value O based on the quantized value O and the errors ErrC, ErrM, and outputs output values Cout, Mout of output image data to the printer 102 (see FIG. 2).

The input value-correcting portions 203 and 204 (correcting units) each correct an individual color component value of the pixel currently being processed, by adding a quantization error distributed to the individual color component of the position of the pixel currently being processed to the individual color component value constituting the data of the pixel currently being processed.

An independently quantizing portion 306 (first quantizing unit) independently quantizes, to M gradations, individual color components that are set to be independently quantized (yellow and black in this embodiment) in the pixel currently being processed after correction by the input value-correcting portions 203 and 204.

A distributedly quantizing portion 303 (second quantizing unit) calculates a total of the color component values of two or more color components that are set to be quantized in a coordinated manner (cyan and magenta in this embodiment) in the pixel currently being processed after correction by the input value-correcting portions 203 and 204, and quantizes the calculated total to the number of gradations determined depending on the number of individual color components that are set to be quantized in a coordinated manner and the number of gradations M.

The quantized value-distributing portion 207 (dividing unit) divides the value of the result of the quantization performed by the distributedly quantizing portion 303, in accordance with the ratio of the individual color component values that are set to be quantized in a coordinated manner, as quantized values of the individual color component values that are set to be quantized in a coordinated manner.

The error-calculating portions 208 and 209 (distributing units) distribute differences between a quantized value of the individual color component set to be independently quantized by the independently quantizing portion 306 and quantized values of the individual color components obtained by the division by the quantized value-distributing portion 207, and their unquantized values, to unquantized pixel positions as quantization errors of the individual color components in the pixel currently being processed.

Figure 3:
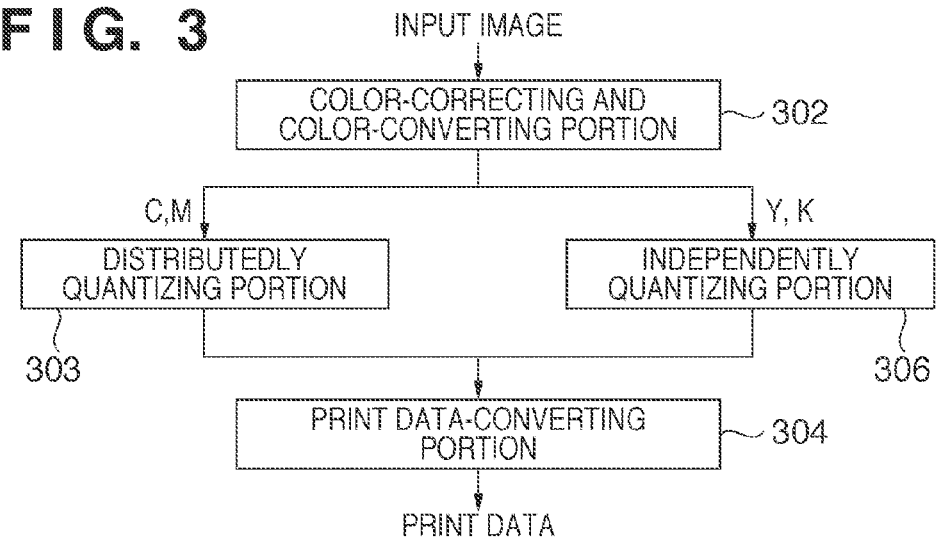
FIG. 3 is a diagram showing a processing procedure for performing processes for cyan and magenta.

First, input image data are received, processed by a color-correcting and color-converting portion 302, the distributedly quantizing portion 303 or the independently quantizing portion 306, and a print data-converting portion 304, and then transmitted as output image data (print data) to the printer 102 (see FIG. 3).

Overall Processing Procedure of the Image-Processing Apparatus

First, an image that is to be printed is input to the host computer 101 as an image-processing apparatus from the external storage apparatus 104, the input apparatus 103, or the like. Then, the host computer 101 inputs the input color or gray scale image to the color-correcting and color-converting portion 302 according to an image-processing program executed in the host computer. The color-correcting and color-converting portion 302 performs color correction according to print settings, and converts RGB components ordinarily used in image data into CMYK components suitable for printing in a printer. Then, the distributedly quantizing portion 303 performs the quantization process as shown in FIG. 4 on cyan and magenta of the image converted into CMYK components.

Figure 4:
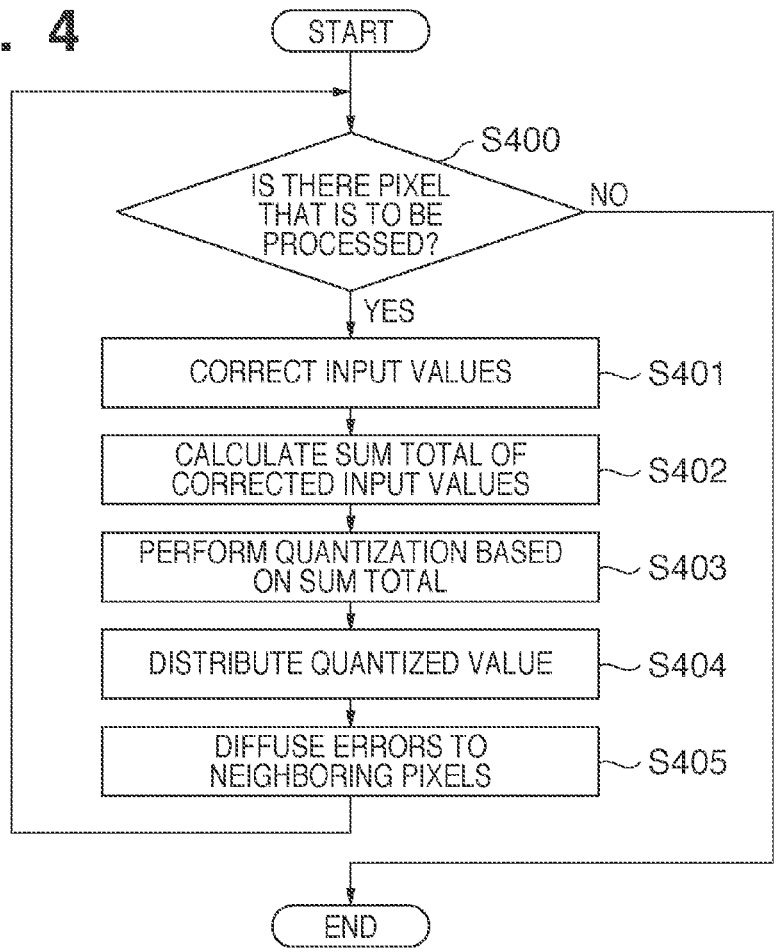
FIG. 4 is a diagram showing a processing procedure for performing basic quantization.

Quantization Process by the Distributedly Quantizing Portion 303 (FIG. 4)

First, the distributedly quantizing portion 303 confirms whether or not there is a pixel that is to be processed (S400). If there is a pixel that is to be processed, the procedure advances to S401, and, if there is no pixel that is to be processed, the series of processes ends without performing quantization.

Here, characters used in numerical formulae described later will be described. A total quantization level N is a sum total of individual quantization levels n. For example, in the case where quantization (n=3) between 0, 1, and 2 is performed for cyan and magenta, the total quantization level is five values (N=5), namely 0, 1, 2, 3, and 4. Furthermore, $\alpha$ is added in order to adjust a threshold value of quantization, and set such that positive and negative error ranges are as close to each other as possible. For example, if the input value range is 0 to 255, and the quantization level is n=3, then $\alpha=256/(n+1)=64$.

First, the distributedly quantizing portion 303 shifts the pixel currently being processed to the next pixel, corrects cyan and magenta input values Cin and Min (it is assumed that the input value range is 0 to 255, and that the maximum values of cyan and magenta input values are Cmax and Mmax (=255)) according to cyan and magenta errors ErrC and ErrM caused by the above-described quantization (S401), and obtains corrected values Cin' and Min' ($-\alpha<$Cin', Min'$<$Cmax (Mmax)$+\alpha$). Here, the ranges of Cin' and Min' are $-64<$Cin', Min'$<319$, because their quantization level is n=3 as described above.

$$Cin'=Cin+ErrC \qquad (F101)$$

$$Min'=Min+ErrM$$

Then, the distributedly quantizing portion 303 obtains a sum total S of the corrected values using a formula F102 (S402). Here, in the case where S is out of a certain range ($-\alpha<$S$<$Cmax+Mmax+$\alpha$, $-64<$S$<574$, the range of the region A in FIG. 13), clipping is performed (a process is performed such that a quantized value is within the range of 0 to 4).

$$S=Cin'+Min' \qquad (F102)$$

Next, the distributedly quantizing portion 303 quantizes the sum total S of the corrected values using a formula F103 (S403), and obtains a quantized value O.

$$O=\{(S+\alpha)\times N\}/(Cmax+Mmax+\alpha\times 2+1) \qquad (F103)$$

Figure 13:
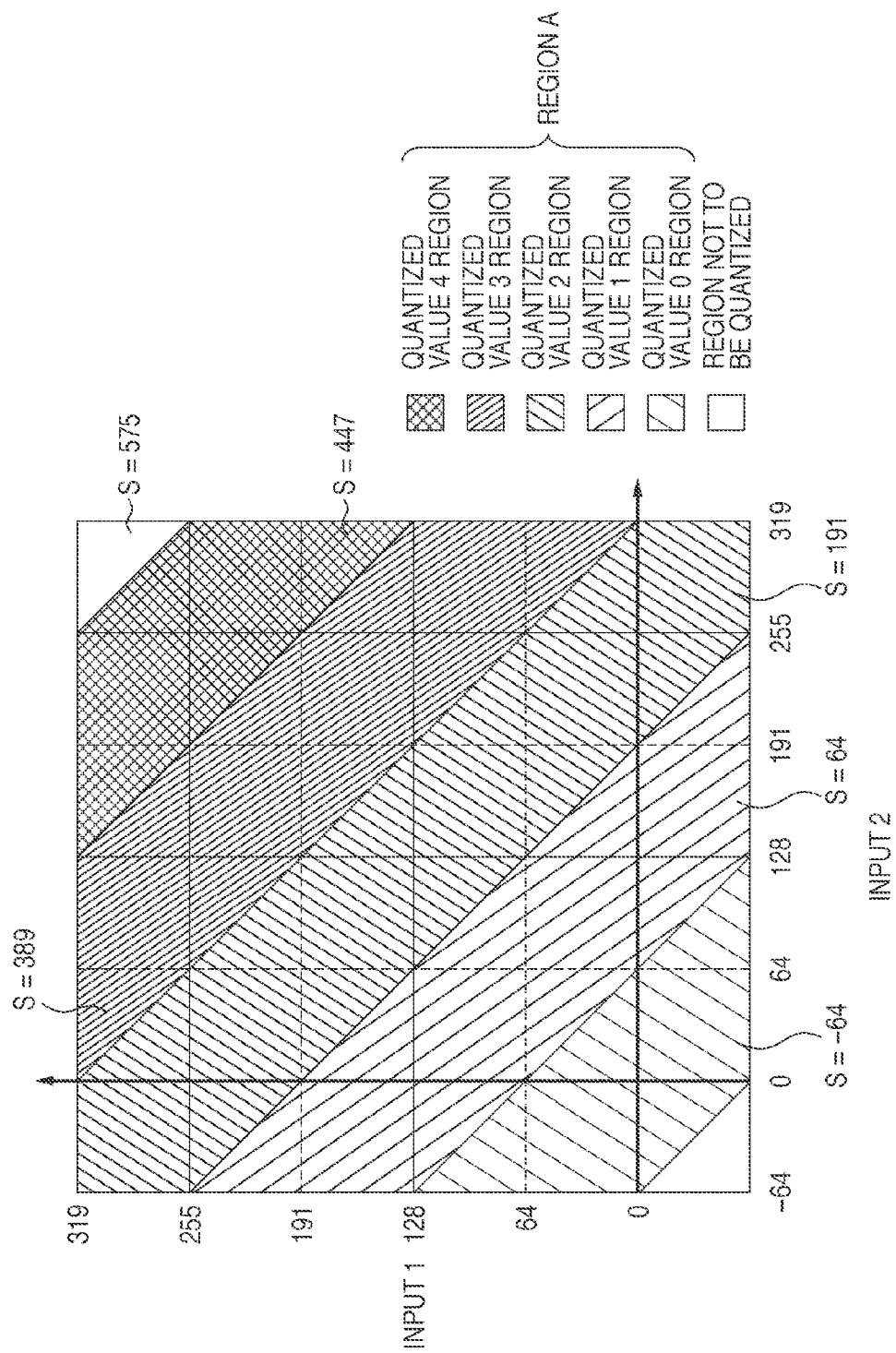
FIG. 13 is a graph showing the relationship between input and output (quantized values) of quantization using a numerical formula.

FIG. 13 specifically shows the relationship between input and output of the quantization using the formula F103. An Input 1 is Cin', and an Input 2 is Min'.

Here, a calculation example in the case where the corrected value Cin'=229, and Min'=157 will be described. The sum total S of the corrected values is 229+157=386. Since the quantization level N=5, and Cmax=Mmax=255, the following result is obtained by substituting these values into the formula F103. Here, the symbol ($\approx$) indicates that values after the decimal point are excluded.

$$O=\{(386+64)\times 5\}/(255+255+64\times 2+1)=3.52\ldots\approx 3$$

Subsequently, the distributedly quantizing portion 303 uses the following formula to distribute the quantized value O to cyan and magenta (S404), and determines quantized output values. The quantized output values for cyan and magenta are respectively taken as Cout and Mout.

$$Cout=\{O\times(Cin'+\alpha)+(S+\alpha\times 2)/2\}/(S+\alpha\times 2) \qquad (F104)$$

$$Mout=O-Cout$$

If the quantized value is O=3, Cout and Mout can be obtained as follows.

$$Cout=\{3\times(229+64)+(386+64\times 2)/2\}/(386+64\times 2)=2.21\ldots\approx 2$$

$$Mout=3-2=1$$

After the quantized value is obtained, the distributedly quantizing portion 303 obtains errors corresponding to the obtained quantized value respectively for cyan and magenta, and diffuses the errors to neighboring pixels (S405). These processes are repeated until there is no further pixel that is to be processed. When the processes on one raster end according to this sort of procedure, similar processes are repeated on the next raster.

Colors other than cyan and magenta (that is, yellow and black) are quantized by the independently quantizing portion 306. Here, an independent quantization for each color is performed using an ordinarily used conventional error diffusion process. The quantized data is converted by the print data-converting portion 304 into a format that can be interpreted by a printer, and printing is performed when the print data is transmitted to the printer.

According to this embodiment, quantization with coordination between colors can be performed using a simple calculation without a complicated comparison or a table having a large data size, and cyan and magenta dots can be arranged so as to be uniformly dispersed from each other. Accordingly, the calculation amount and the memory size necessary for the processes can be reduced.

Here, in this embodiment, it is assumed that CMYK colors are used, but necessary colors may be further added or reduced according to the purpose in order to express a wide variety of colors or to simplify the processes. Furthermore, the present invention has been explained for an application to cyan and magenta, but various combinations can be selected, such as cyan and black, magenta and yellow, and so on.

Furthermore, the present invention can be applied not only to two colors but also to a larger number of colors. For example, in the case where CMK dots are to be dispersed from each other, the above-described formulae F101, F102, F103, and F104 need only be extended as follows to obtain F101', F102', F103', and F104'. Here, the corrected value, the error, the maximum input value, and the output value corresponding to black are respectively taken as Kin', eK, Kmax, and Kout.

$$Cin'=Cin+eC$$

$$Min'=Min+eM \qquad (F101')$$

$$Kin'=Kin+eK$$

$$S=Cin'+Min'+Kin' \qquad (F102')$$

$$O=\{(S+\alpha) \times N\}/(Cmax+Mmax+Kmax+\alpha \times 3+1) \qquad (F103')$$

$$Cout=\{O \times (Cin'+\alpha)+(S+\alpha \times 3)/2\}/(S+\alpha \times 3)$$

$$Mout=\{O \times (Min'+\alpha)+(S+\alpha \times 3)/2\}/(S+\alpha \times 3)$$

$$Kout=O-Cout-Mout \qquad (F104')$$

Furthermore, in this embodiment, in the case where a sum total of corrected values is quantized, a quantized value is obtained using the formula F103 or F103', but the calculation formula for obtaining a quantized sum total is not limited to this, and tables or the like may be used without using calculation formulae. Since a one-dimensional table requires a smaller memory than a multi-dimensional table, a fixed sum total of quantized values may be used according to a sum total of corrected values.

Furthermore, in this embodiment, the distribution process of the output values is such that final output values are obtained using the formula F104 or F104', but there is no limitation to this, and other calculation formulae may be used. That is to say, the error-calculating portions 208 and 209 may distribute the quantized value, by substituting a quantized value for each pixel with respect to the total of the corrected values obtained by the input value-correcting portions 203 and 204, or a plurality of values with which the ratio of a corrected value can be calculated, into a high-dimensional function or a trigonometric function. For example, the distribution formula F104 can be changed into a formula F104″ using a trigonometric function.

$$Cout=O \times (\cos\{(Cin'/S) \times \pi + \pi\}+1)/2$$

$$Mout=O-Cout \qquad (F104'')$$

Furthermore, in this embodiment, the entire region of an input image is processed, but the present invention may be applied also to a partial region of the image. Furthermore, it is possible to switch whether or not to apply the present invention or to change the application degree depending on a given signal intensity (described in a fifth embodiment). That is to say, it is possible to quantize at least a partial region of the input image data, or to switch whether or not to perform a quantization process on the input image data using a predetermined signal intensity as a threshold value.

Furthermore, in this embodiment, the processes are performed on the raster level, but the processes may be performed on the image level or on the pixel level according to the performance of a printer, the memory amount or the calculation speed of a host computer, and the like.

Furthermore, in this embodiment, it is assumed that the image-forming apparatus is an inkjet printer, but the present invention can be applied to various apparatus such as laser printers, as long as an image can be formed using at least either recording scans of a plurality of colors or recording scans performed a plurality of times.

Second Embodiment

The present invention can be applied not only between colors shown in the first embodiment, but also between recording scans. This embodiment shows an example in which the present invention is applied between recording scans of an inkjet printer. In the following description, constituent elements similar to those in the first embodiment (FIG. 1) are denoted by the same reference numerals. It is assumed that the inkjet printer according to this embodiment uses a 2-pass recording method that forms an image by performing recording scans twice on the same image formation face, and ternary quantization is performed.

Figure 8:
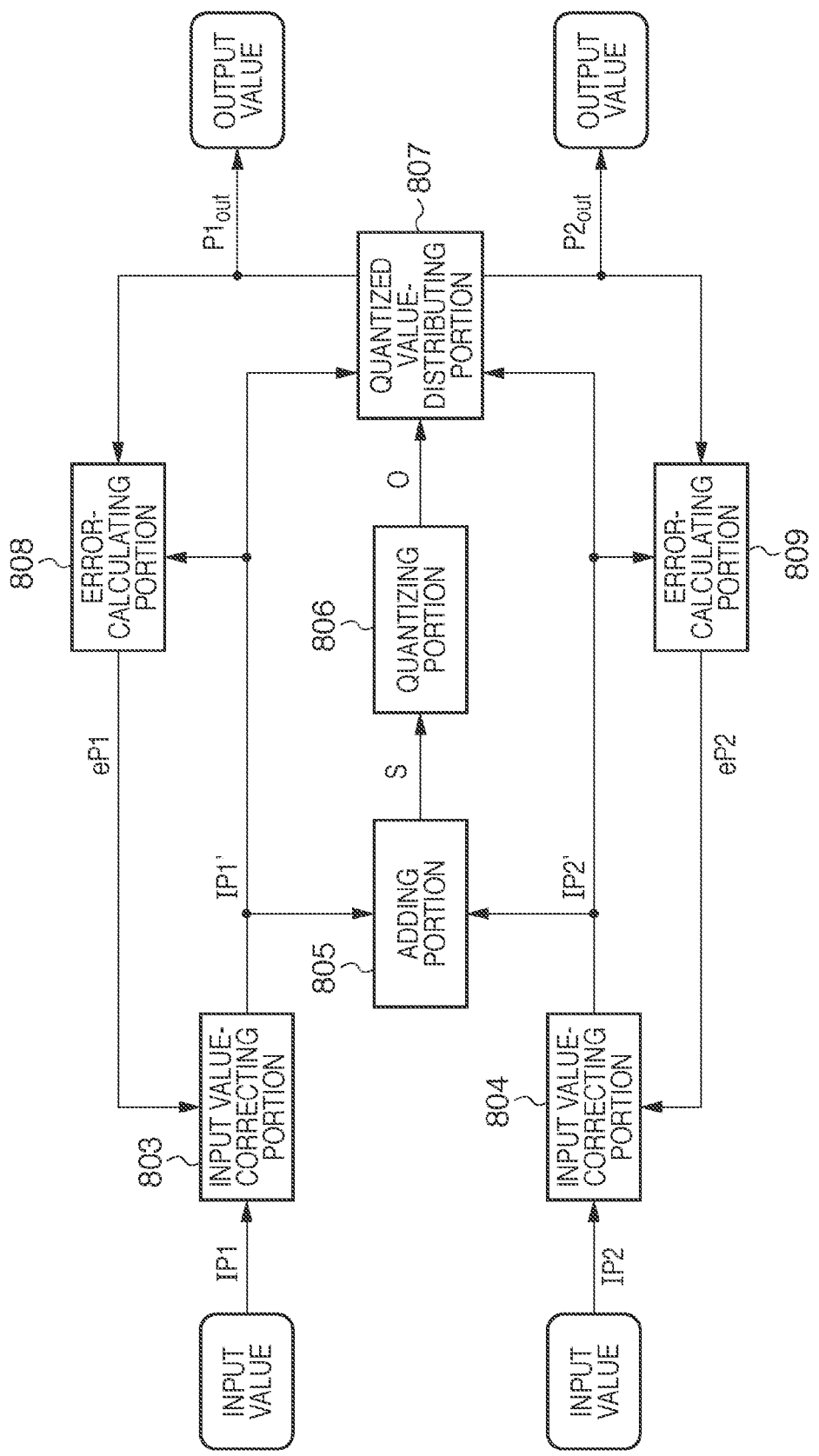
FIG. 8 is a diagram showing a configuration for performing quantization between recording scans.
Figure 9:
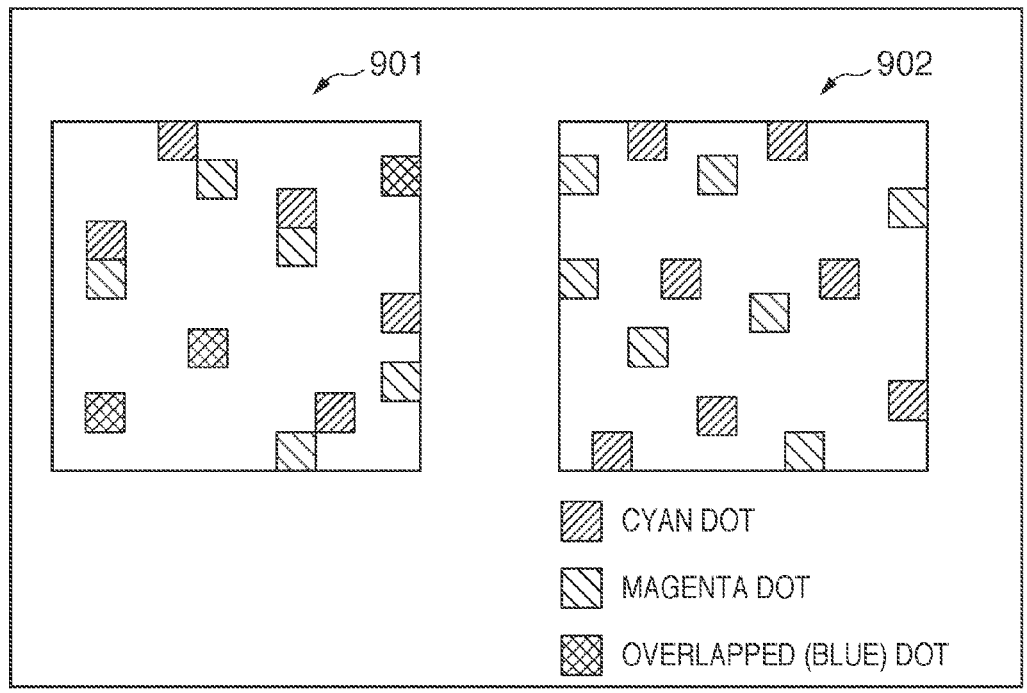
FIG. 9 is a view showing a difference in the dot arrangement between the case where quantization is performed independently and in a coordinated manner.

The CPU 105 of the host computer 101 is provided with input value-correcting portions 803 and 804 that correct input values IP1, IP2 of input image data in accordance with errors eP1, eP2 caused by quantization, an adding portion 805 that obtains a sum total S of the corrected values IP1', IP2', a quantizing portion 806 that obtains a quantized value O for the sum total S of the corrected values IP1', IP2', error-calculating portions 808 and 809 that obtain errors eP1, eP2 caused by the quantization (including an error buffer), and a quantized value-distributing portion 807 that distributes the quantized value O, and outputs output values P1out, P2out of output image data to the printer 102 (see FIG. 8).

Figure 5:
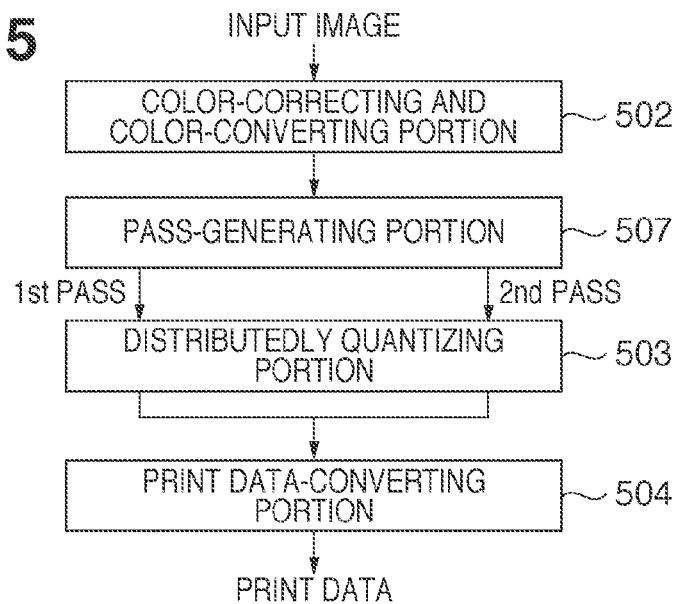
FIG. 5 is a diagram showing the overall processing procedure for performing processes between recording scans.

First, input image data are received, processed by a color-correcting and color-converting portion 502, a pass-generating portion 507, a distributedly quantizing portion 503, and a print data-converting portion 504, and then transmitted as the output values P1out, P2out of output image data (print data) to the printer 102 (see FIG. 5). The pass-generating portion 507 generates a plurality of passes corresponding to recording scans from one input image data set.

Overall Processing Procedure of the Image-Processing Apparatus

First, an image that is to be printed is input to the host computer 101 as an image-processing apparatus from the external storage apparatus 104, the input apparatus 103, or the like. Then, the host computer 101 inputs the input color or gray scale image to the color-correcting and color-converting portion 502 according to a print image-processing program executed in the host computer. The color-correcting and color-converting portion 502 performs color correction according to print settings, and converts RGB components ordinarily used in image data into CMYK components suitable for printing in a printer. Subsequently, the processes are performed independently for each color. In this example, the processes are described for the color black.

The pass-generating portion 507 divides the darkness for black of an image converted into CMYK components so as to correspond to recording scans (which are assumed to be scanning image data in a 1st and a 2nd pass) using a given method. As a darkness-dividing process, for example, it is possible to divide the darkness into 40% and 60% for the 1st and the 2nd passes, or to use a division table corresponding to the position of the pixel currently being processed. Here, 40% darkness (IP1) and 60% darkness (IP2) are always respectively allocated to the 1st pass and the 2nd pass for an input value I.

$$IP1=I \times 0.4 \qquad (F200)$$

$$IP2=I-IP1$$

The darknesses IP1 and IP2 obtained by the darkness-dividing process are quantized by the distributedly quantizing portion 503 as shown in FIG. 4.

Quantization Process by the Distributedly Quantizing Portion 503 (FIG. 4)

First, the distributedly quantizing portion 503 confirms whether or not there is a pixel that is to be processed (S400). If there is a pixel that is to be processed, the procedure advances to S401, and, if there is no pixel that is to be processed, the series of processes ends without performing quantization.

Here, characters used in numerical formulae described later will be described. A total quantization level N is a sum total of individual quantization levels n. For example, in the case where quantization (n=3) between 0, 1, and 2 is performed for a 1st and a 2nd pass, the total quantization level is five values (N=5), namely 0, 1, 2, 3, and 4. Furthermore, α is added in order to adjust a threshold value of quantization, and set such that positive and negative error ranges are as close to each other as possible. For example, if the input value range is 0 to 255, and the quantization level is n=3, then α=256/(n+1)=64.

First, the distributedly quantizing portion 503 shifts the pixel currently being processed to the next pixel, corrects IP1 and IP2 corresponding to input values for recording scans (it is assumed that the range in this embodiment is 0 to 255, and that the maximum input value is Imax (=255)) in accordance with errors eP1 and eP2 in the 1st and the 2nd passes caused by the above-described quantization (S401), and obtains corrected values IP1' and IP2' ($-\alpha < IP1'$, $IP2' < Imax+Imax+\alpha$). Here, the ranges of IP1' and IP2' are $-64 < IP1'$, $IP2' < 319$, because their quantization level is n=3 as described above.

$$IP1'=IP1+eP1 \quad (F201)$$

$$IP2'=IP2+eP2$$

Then, the distributedly quantizing portion 503 obtains a sum total S of the corrected values using a formula F202 (S402). Here, in the case where S is out of a certain range ($-\alpha < S < Imax+Imax+\alpha$), clipping is performed.

$$S=IP1'+IP2' \quad (F202)$$

Then, the distributedly quantizing portion 503 quantizes the sum total S of the corrected values (S403), and obtains a quantized value O.

$$O=\{(S+\alpha) \times N\}/(Imax+Imax+\alpha \times 2+1) \quad (F203)$$

As Specific Values, in the Case where the corrected value IP1'=90, and IP2'=105, the sum total S of the corrected values=90+105=195. The quantized value O can be obtained as follows. Here, the symbol (≈) indicates that values after the decimal point are excluded.

$$O=\{(195+64) \times 5\}/(255+255+64 \times 2+1)=2.02 \ldots \approx 2$$

Subsequently, the distributedly quantizing portion 503 uses the following formula to distribute the quantized value O to the 1st and the 2nd passes (S404), and determines quantized output values. The quantized output values in the 1st and the 2nd passes are respectively taken as P1out and P2out.

$$P1out=\{O \times (IP1'+\alpha)+(S+\alpha \times 2)/2\}/(S+\alpha \times 2) \quad (F204)$$

$$P2out=O-P1out$$

The quantized value O=2 described above is substituted into the formula.

$$P1out=\{2 \times (90+64)+(195+64 \times 2)/2\}/(195+64 \times 2)= 1.45 \ldots \approx 1$$

$$P2out=2-1=1$$

After the quantized value is obtained, the distributedly quantizing portion 503 obtains errors corresponding to the obtained quantized value respectively for the 1st and the 2nd passes, and diffuses the errors to neighboring pixels (S405). These processes are repeated until there is no further pixel that is to be processed. When the processes on one raster end in the above-described flow, similar processes are repeated on the next raster. The quantized data is converted by the print data-converting portion 504 into a format that can be interpreted by a printer, and printing is performed when the print data is transmitted to the printer.

According to this embodiment, quantization with coordination between recording scans can be performed using a simple calculation without a complicated comparison or a table having a large data size, and dots can be arranged so as to be uniformly dispersed from each other between recording scans in the 1st and the 2nd passes. Accordingly, the necessary calculation amount and memory size can be reduced.

Here, in this embodiment, the number of recording scans is set to two passes, and the application is made to the same color, but there is no limitation to this. In the case where dots are to be dispersed from each other not only between recording scans but also between colors according to the purpose, the application can be made to recording scans of a plurality of colors, or only to a partial passes for a single color if the number of passes is large.

Furthermore, the present invention can be applied not only to cases in which the number of recording scans is two passes but also to cases in which a larger number of recording scans are performed.

For example, if dots are to be dispersed from each other between three passes, the numerical formulae F201, F202, F203, and F204 need only be extended as follows to obtain F201', F202', F203', and F204'. In the following formulae, parameters corresponding to a 3rd pass are respectively taken as a corrected value IP3', an error eP3, and an output value P3out.

$$IP1'=IP1+eP1$$

$$IP2'=IP2+eP2 \quad (F201')$$

$$IP3'=IP3+eP3$$

$$S=IP1'+IP2'+IP3' \quad (F202')$$

$$O=\{(S+\alpha) \times N\}/(Imax+Imax+Imax+\alpha \times 3+1) \quad (F203')$$

$$P1out=\{O \times (IP1'+\alpha)+(S+\alpha \times 3)/2\}$$

$$P2out=\{O \times (IP2'+\alpha)+(S+\alpha \times 3)/2\}$$

$$P3out=O-P1out-P2out \quad (F204')$$

Furthermore, in this embodiment, in the case where a sum total of corrected values is quantized, a quantized value is obtained using the formula F203 or F203', but the calculation formula for obtaining a quantized sum total is not limited to this, and no calculation formulae have to be used. There are also methods using tables. Since a one-dimensional table requires a smaller memory than a multi-dimensional table, a fixed sum total of quantized values may be used according to a sum total of corrected values.

Furthermore, the distribution method of the output values is such final output values are obtained using the calculation formula F204 or F204', but there is no limitation to this, and other calculation formulae may be used. For example, the distribution formula F204 can be changed into a formula F204" as follows using a trigonometric function. Furthermore, for example, a high-dimensional function also may be used.

$$P1out=O\times(\cos\{(IP1'/S)\times\pi+\pi\}+1)/2$$

$$P2out=O-P1out \hspace{2cm} (F204")$$

Furthermore, in this embodiment, the entire region of an input image is processed, but the present invention may be applied also to a partial region of the image. Furthermore, it is possible to switch whether or not to apply the present invention or to change the application degree depending on a given signal intensity (described in the fifth embodiment).

Furthermore, in this embodiment, the processes are performed on the raster level, but there is no limitation to this. The processes may be performed on the image level or on the pixel level according to the conditions, such as the performance of a printer, the memory amount or the calculation speed of a host computer, and the like.

Furthermore, the inkjet printer as the image-forming apparatus in this embodiment is shown merely as an example, and it will be appreciated that the present invention can be applied to various apparatus such as laser printers, as long as an image can be formed using a plurality of colors, by performing recording scans a plurality of times, or by performing recording scans a plurality of times using a plurality of colors.

Third Embodiment

The present invention can be applied also between recording scans of an inkjet printer while changing the processing procedure of the second embodiment. In the following description, constituent elements similar to those in the first embodiment (FIG. 1) are denoted by the same reference numerals. It is assumed that the inkjet printer according to this embodiment uses a 2-pass recording method that forms an image by performing recording scans twice on the same image formation face, and ternary quantization is performed.

The image-processing apparatus according to this embodiment has the following configuration. In this embodiment, input image data includes first image data that is to be quantized, and second image data that is obtained by dividing a signal value of the first image data into a plurality of signal values.

An input value-correcting portion 705 (first calculating unit) calculates a corrected value for each pixel through addition of an error caused by a quantization process performed prior to that on the pixel currently being processed of the first image data.

Input value-correcting portions 703 and 704 (second calculating units) calculate corrected values, by adding all errors caused by a quantization process performed prior to that on the pixel currently being processed of the second image data, to pixel values of the pixel currently being processed.

A quantizing portion 707 (third calculating unit) calculates a quantized value for each pixel based on the corrected values calculated by the input value-correcting portions 703 and 704.

A quantized value-distributing portion 709 (distributing unit) distributes the quantized value calculated by the quantizing portion 707 to recording scans according to the ratio of a corrected value calculated by the input value-correcting portion 705 with respect to the total of corrected values calculated by the input value-correcting portion 705.

Figure 7:
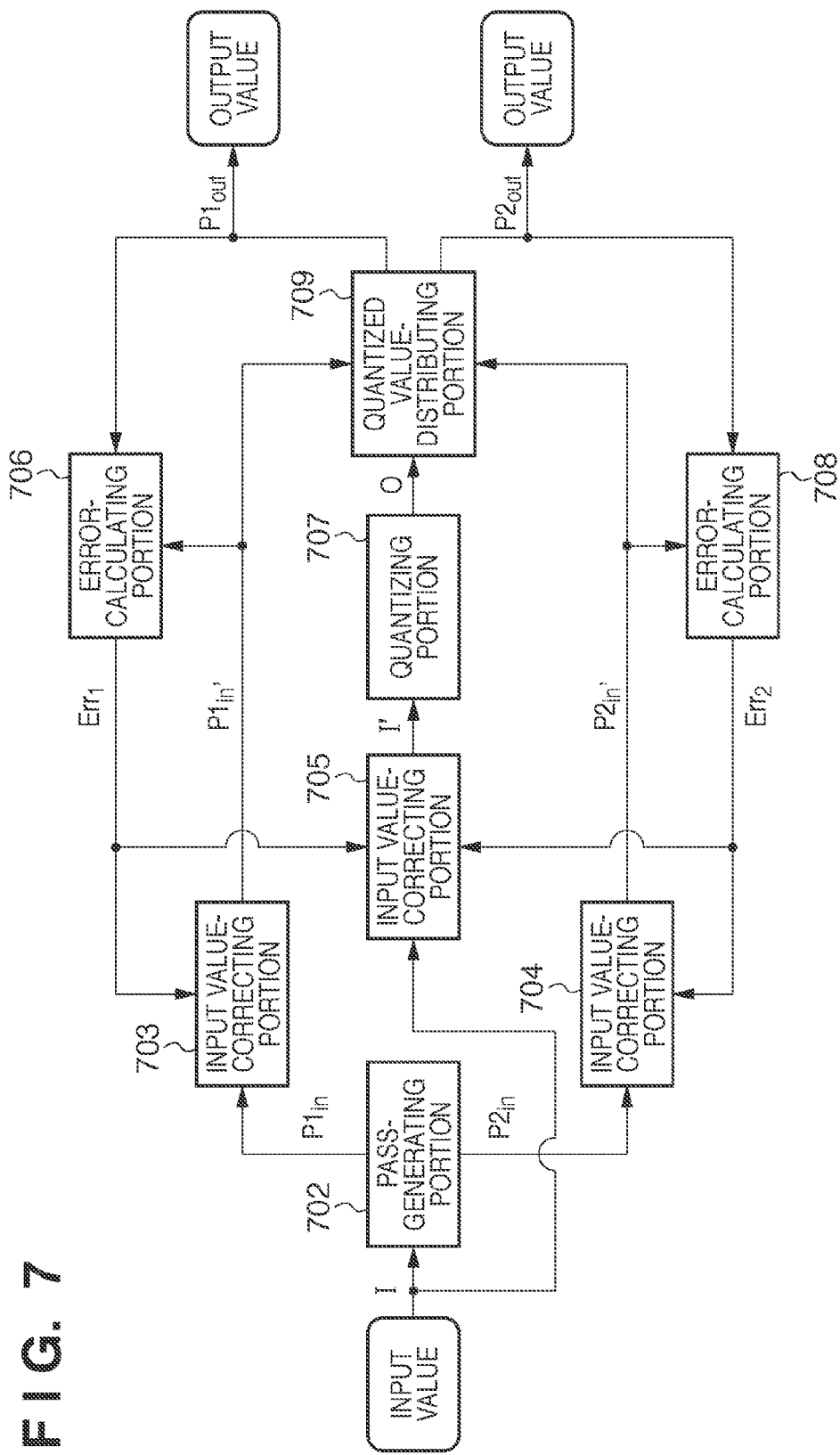
FIG. 7 is a diagram showing a configuration for performing quantization between recording scans.

That is to say, the CPU 105 of the host computer 101 is provided with a pass-generating portion 702 that generates input values P1in, P2in corresponding to passes from an input value I of input image data, the input value-correcting portions 703, 704, and 705 that correct input values P1in, P2in in accordance with errors Err1, Err2 caused by quantization, the quantizing portion 707 that obtains a quantized value O for the corrected value I', error-calculating portions 706 and 708 that obtain errors Err1, Err2 caused by the quantization (including an error buffer), and the quantized value-distributing portion 709 that distributes the quantized value O based on the errors Err1, Err2, and outputs output values P1out, P2out of output image data to the printer 102 (see FIG. 7).

First, input image data is received, processed by the color-correcting and color-converting portion 502, the pass-generating portion 507, the distributedly quantizing portion 503, and the print data-converting portion 504, and then transmitted as output image data (print data) to the printer 102 (see FIG. 5). The pass-generating portion 507 generates a plurality of passes corresponding to recording scans from one input image data set.

Overall Processing Procedure of the Image-Processing Apparatus

First, characters used in numerical formulae described later will be described. A total quantization level N is a sum total of quantization levels n in the respective passes. For example, in the case where quantization (n=3) is performed, the total quantization level is five values (N=5), namely 0, 1, 2, 3, and 4. Furthermore, $\alpha$ is added in order to adjust a threshold value of quantization, and set such that positive and negative error ranges are as close to each other as possible. For example, if the input value range is 0 to 255, and the quantization level is n=3, then $\alpha=256/(n+1)=64$.

First, an image that is to be printed is input to the host computer 101 as an image-processing apparatus from the external storage apparatus 104, the input apparatus 103, or the like. Then, the host computer 101 inputs the input color or gray scale image to the color-correcting and color-converting portion 502 according to a print image-processing program executed in the host computer. The color-correcting and color-converting portion 502 performs color correction according to print settings, and converts RGB components ordinarily used in image data into CMYK components suitable for printing in a printer. Subsequently, the processes are performed independently for each color. Here, the processes are described for the color black.

The pass-generating portion 507 divides the darkness of black of an image converted into CMYK components so as to correspond to recording scans (which are assumed to be scanning image data in a 1st and a 2nd pass) using a given method. As a darkness-dividing method, for example, it is possible to divide the darkness into 40% and 60% for the 1st and the 2nd passes, or to use a division table corresponding to the position of the pixel currently being processed. Here, 40% darkness (IP1) and 60% darkness (IP2) are always respectively allocated to the 1st pass and the 2nd pass for an input value I.

$$IP1=I\times0.4 \hspace{2cm} (F300)$$

$$IP2=I-IP1$$

Figure 6:
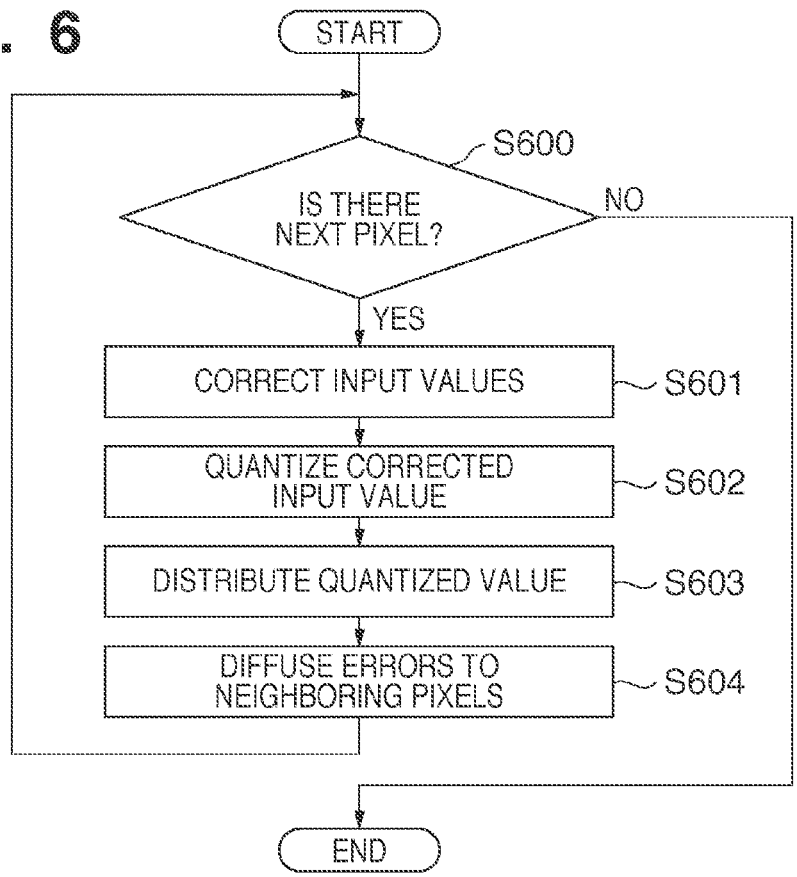
FIG. 6 is a diagram showing a processing procedure for performing quantization between recording scans.

The darknesses IP1 and IP2 obtained by the division are quantized by the distributedly quantizing portion 503 as shown in FIG. 6.

Quantization Process by the Distributedly Quantizing Portion 503 (FIG. 6)

First, the distributedly quantizing portion 503 confirms whether or not there is a pixel that is to be processed (S600). If there is a pixel that is to be processed, the procedure advances to S601, and, if there is no pixel that is to be processed, the series of processes ends without performing quantization. Then, the distributedly quantizing portion 503 shifts the pixel currently being processed to the next pixel, corrects the input value I and values IP1 and IP2 corresponding to input values for recording scans (it is assumed that the input value range is 0 to 255, and that the maximum input value is Imax (=255)) in accordance with errors eP1 and eP2 in the 1st and the 2nd passes caused by the above-described quantization (S601), and obtains corrected values I', IP1', and IP2' (−α<I', IP1', IP2'<Imax+α). Here, the ranges of I', IP1', and IP2' are −64<I', IP1', IP2'<319, because their quantization level is n=3.

$$I'=I+eP1+eP2$$

$$IP1'=IP1+eP1 \quad\quad (F301)$$

$$IP2'=IP2+eP2$$

Then, the distributedly quantizing portion 503 quantizes the corrected value I' (S602), and obtains a quantized value O.

$$O=\{(I'+\alpha)\times N\}/(Imax+Imax+\alpha\times 2+1) \quad\quad (F302)$$

As Specific Values, in the Case where the corrected value I'=195, IP1'=90, and IP2'=105, the quantized value O can be obtained as follows. Here, the symbol (≈) indicates that values after the decimal point are excluded.

$$O=\{(195+64)\times 5\}/(255+255+64\times 2+1\}=2.02\ldots \approx 2$$

Subsequently, the distributedly quantizing portion 503 uses a formula F303 to distribute the quantized value O to the 1st and the 2nd passes (S603), and determines quantized output values. The quantized output values in the 1st and the 2nd passes are respectively taken as P1out and P2out.

$$P1out=\{O\times(IP1'+\alpha)+(I'+\alpha\times 2)/2\}/(I'+\alpha\times 2) \quad\quad (F303)$$

$$P2out=O-P1out$$

When the quantized value O=2 described above is substituted into the formula, P1out and P2out can be obtained as follows.

$$P1out=\{2\times(90+64)+(195+64\times 2)/2\}/(195+64\times 2)= 1.45\ldots \approx 1$$

$$P2out=2-1=1$$

After the quantized value is obtained, the distributedly quantizing portion 503 obtains errors corresponding to the obtained quantized value respectively for the 1st and the 2nd passes, and diffuses the errors to neighboring pixels (S604). These processes are repeated until there is no further pixel that is to be processed. When the processes on one raster end in the above-described flow, similar processes are repeated on the next raster. The quantized data is converted by the print data-converting portion 504 into a format that can be interpreted by a printer, and printing is performed when the print data is transmitted to the printer.

According to this embodiment, quantization with coordination between recording scans can be performed using a simple calculation without a complicated comparison or a table having a large data size, and dots can be arranged so as to be uniformly dispersed from each other between recording scans in the 1st and the 2nd passes. Accordingly, the necessary calculation amount and memory size can be reduced.

Here, in this embodiment, the number of recording scans is set to two passes, and the application is made to the same color, but, in the case where dots are to be dispersed from each other not only between recording scans but also between colors according to the purpose, the application can be made to recording scans of a plurality of colors, or only to a partial pass for a single color if the number of passes is large.

Furthermore, the present invention can be applied not only to cases in which the number of recording scans is two passes but also to cases in which a larger number of recording scans are performed. For example, if the number of recording scans is set to three passes, dots can be arranged so as to be further dispersed from each other. In this case, the above-described formulae F301, F302, and F303 need only be extended as follows to obtain formulae F301', F302', and F303'. Here, parameters corresponding to a 3rd pass are respectively taken as a corrected value IP3', an error eP3, and an output value P3out.

$$IP'=IP1+eP1+eP2+eP3$$

$$IP1'=IP1+eP1$$

$$IP2'=IP2+eP2 \quad\quad (F301')$$

$$IP3'=IP3+eP3$$

$$O=\{(IP'+\alpha)\times N\}/(Imax+Imax+Imax+\alpha\times 3+1) \quad\quad (F302')$$

$$P1out=\{O\times(IP1'+\alpha)+(IP'+\alpha\times 3)/2\}$$

$$P2out=\{O\times(IP2'+\alpha)+(IP'+\alpha\times 3)/2\}$$

$$P3out=O-P1out-P2out \quad\quad (F303')$$

Furthermore, in this embodiment, in the case where a sum total of corrected values is quantized, a quantized value is obtained using the formula F302 or F302', but the calculation formula for obtaining a quantized sum total is not limited to this, and no calculation formulae have to be used. There are also methods using tables. Since a one-dimensional table requires a smaller memory than a multi-dimensional table, a fixed sum total of quantized values may be used according to a sum total of corrected values.

Furthermore, the distribution method of the output values is such that final output values are obtained using the formula F303 or F303', but there is no limitation to this, and other calculation formulae may be used. For example, the distribution calculation formula F303 can be changed into a formula F303" as follows using a trigonometric function. Furthermore, for example, a high-dimensional function also may be used.

$$P1out=O\times(\cos\{(IP'/S)\times\pi+\pi\}+1)/2$$

$$P2out=O-P1out \quad\quad (F303'')$$

Furthermore, in this embodiment, the entire region of an input image is processed, but the present invention may be applied also to a partial region of the image. Furthermore, it is possible to switch whether or not to apply the present invention or to change the application degree depending on a given signal intensity (described in the fifth embodiment).

Furthermore, in this embodiment, the processes are performed on the raster level, but there is no limitation to this. The processes may be performed on the image level or on the pixel level according to the conditions, such as the performance of a printer, the memory amount or the calculation speed of a host computer, and the like.

Furthermore, the inkjet printer as the image-forming apparatus in this embodiment is shown merely as an example, and it will be appreciated that the present invention can be applied to various apparatus such as laser printers, as long as an image can be formed using a plurality of colors, by performing recording scans a plurality of times, or by performing recording scans a plurality of times using a plurality of colors.

Fourth Embodiment

This embodiment shows an example in which the present invention is applied to an inkjet printer. In the following description, constituent elements similar to those in the first embodiment (FIG. 1) are denoted by the same reference numerals. It is assumed that the inkjet printer according to this embodiment uses CMYK colors, and quantization according to the present invention is performed on cyan and magenta. It is assumed that an independent quantization for each color is performed as in conventional examples on yellow and black, and a description thereof is omitted in this embodiment. Furthermore, it is assumed that 2-pass printing is performed for each of cyan and magenta. That is to say, in this embodiment, dots are arranged so as to be uniformly distributed between colors and between recording scans.

Figure 12:
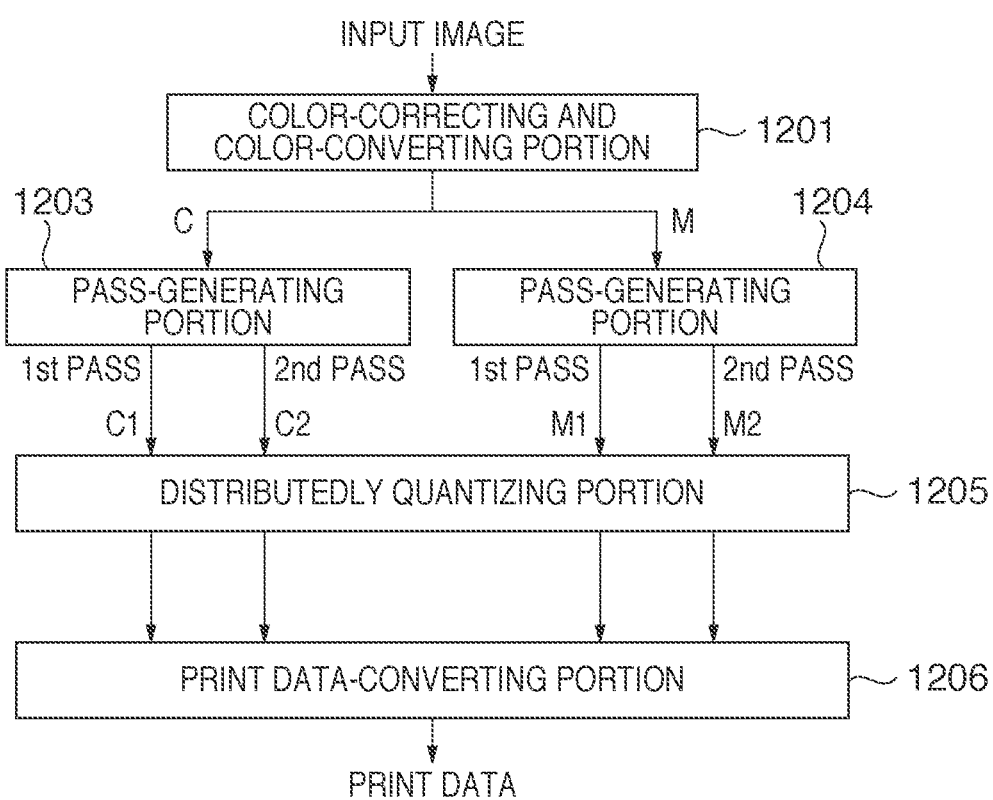
FIG. 12 is a diagram showing a processing procedure for performing processes between cyan and magenta recording scans.

First, input image data are received, processed by a color-correcting and color-converting portion 1201, pass-generating portions 1203 and 1204, a distributedly quantizing portion 1205, and a print data-converting portion 1206, and then transmitted as output image data (print data) to a printer (see FIG. 12). The color-correcting and color-converting portion 1201 converts the input image into CMYK. Among CMYK components, only CM components will be described. The pass-generating portions 1203 and 1204 generate input values corresponding to recording scans, at the pass-generating portions 1203 and 1204 respectively for cyan and magenta. In this embodiment, since 2-pass printing is performed, the pass-generating portions 1203 and 1204 generates input values C1, C2, M1, and M2 corresponding to recording scans as cyan input values C and magenta input values M. The distributedly quantizing portion 1205 quantizes these input values. The print data-converting portion 1206 converts the quantization data into printer data, and transmits it to the printer (see FIG. 12).

Figure 11:
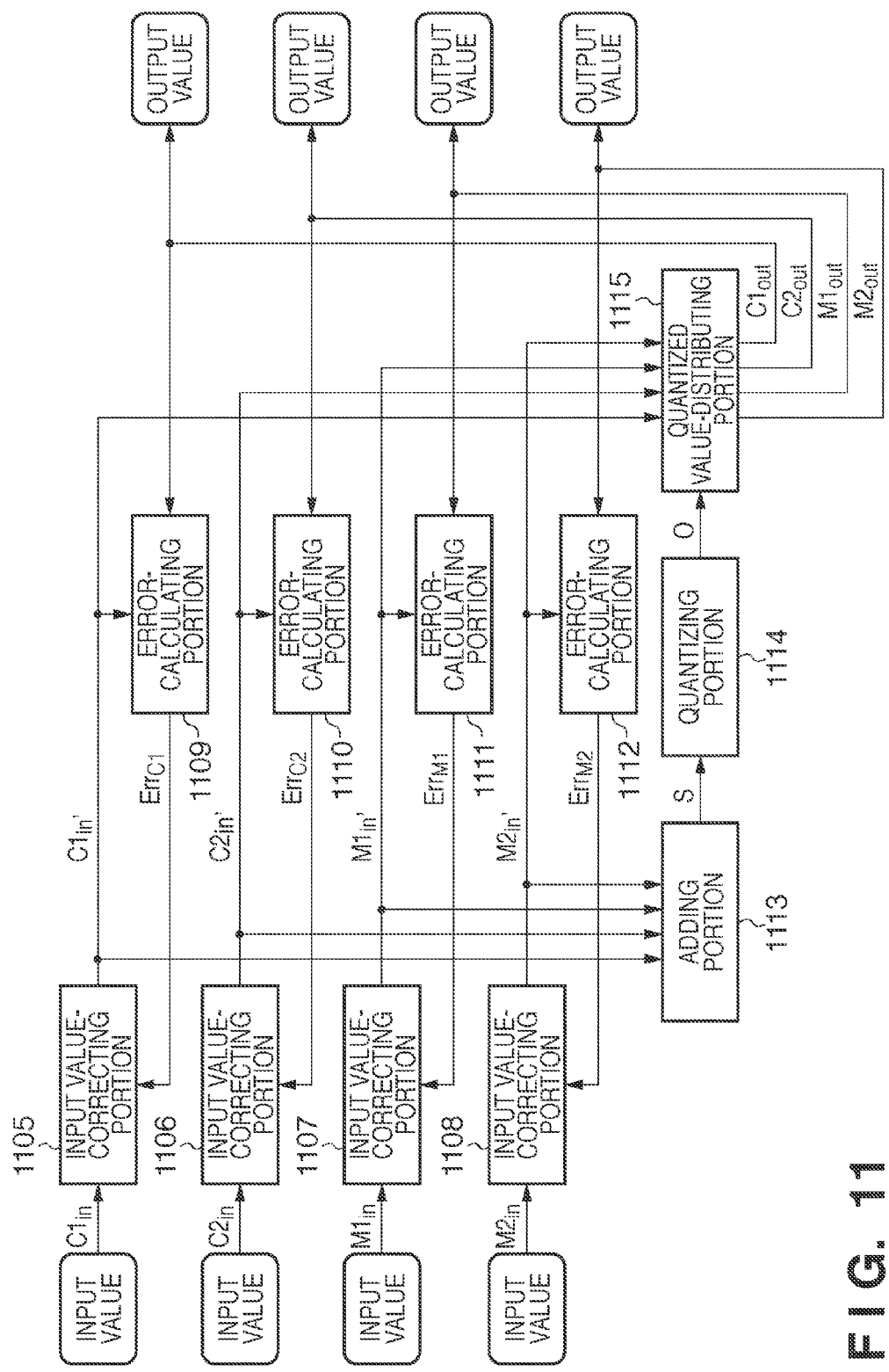
FIG. 11 is a diagram showing a configuration for performing quantization between cyan and magenta recording scans.

The CPU 105 of the host computer 101 is provided with input value-correcting portions 1105 to 1108 that correct the input values C1in, C2in, M1in, M2in of input image data in accordance with errors ErrC1, ErrC2, ErrM1, ErrM2 caused by quantization, an adding portion 1113 that obtains a sum total S of the corrected values C1in', C2in', M1in', M2in', a quantizing portion 1114 that obtains a quantized value O for the sum total S of the corrected values C1in', C2in', M1in', M2in', error-calculating portions 1109 to 1112 that obtain errors ErrC1, ErrC2, ErrM1, ErrM2 caused by the quantization (including an error buffer), and a quantized value-distributing portion 1115 that distributes the quantized value O based on the quantized value O and the errors ErrC1, ErrC2, ErrM1, ErrM2, and outputs output values C1out, C2out, M1out, M2out of output image data to the printer 102 (see FIG. 11).

Overall Processing Procedure of the Image-Processing Apparatus

First, an image that is to be printed is input to the host computer 101 as an image-processing apparatus from the external storage apparatus 104, the input apparatus 103, or the like. Then, the host computer 101 inputs the input color or gray scale image to the color-correcting and color-converting portion 1201 according to a print image-processing program executed in the host computer. The color-correcting and color-converting portion 1201 performs color correction according to print settings, and converts RGB components ordinarily used in image data into CMYK components suitable for printing in a printer. Then, the distributedly quantizing portion 1205 performs the quantization process as shown in FIG. 4 on cyan and magenta of the image converted into CMYK components.

Here, characters used in the following numerical formulae will be described. A total quantization level N is a sum total of individual quantization levels n. For example, in the case where quantization (n=3) between 0, 1, and 2 is performed for cyan and magenta, the total quantization level is five values (N=5), namely 0, 1, 2, 3, and 4. Furthermore, α is added in order to adjust a threshold value of quantization, and set such that positive and negative error ranges are as close to each other as possible. For example, if the input value range is 0 to 255, and the quantization level is n=3, then α=256/(n+1)=64.

The pass-generating portions 1203 and 1204 respectively for cyan and magenta divide the darkness so as to correspond to recording scans (scanning image data in the 1st and the 2nd passes) using a given method. As a darkness-dividing method, for example, it is possible to divide the darkness into 40% and 60% for the 1st and the 2nd passes, or to use a division table corresponding to the position of the pixel currently being processed. Here, when 40% darkness and 60% darkness always respectively allocated to the 1st pass and the 2nd pass for cyan input values C are taken as C1 and C2, they are obtained using the following formula.

$$C1 = C \times 0.4 \quad \text{(F400)}$$

$$C2 = C - C1$$

The magenta input values are also obtained in a similar manner. Here, the darkness may be divided using different methods between cyan and magenta. Input values C1, C2, M1, and M2 obtained by the division are quantized by the distributedly quantizing portion 1205 as shown in FIG. 4.

Quantization Process by the Distributedly Quantizing Portion 1205 (FIG. 4)

First, the distributedly quantizing portion 1205 confirms whether or not there is a pixel that is to be processed (S400). If there is a pixel that is to be processed, the procedure advances to S401, and, if there is no pixel that is to be processed, the series of processes ends without performing the quantization process. Then, the distributedly quantizing portion 1205 shifts the pixel currently being processed to the next pixel, corrects the input values C1, C2, M1, and M2 for quantization (it is assumed that the range in this embodiment is 0 to 255, and that the maximum input values for cyan and magenta are respectively Cmax and Mmax (=255)) in accordance with errors eC1, eC2, eM1, and eM2 caused by the above-described quantization in the 1st and the 2nd passes (S401), and obtains corrected values C1', C2', M1', and M2' ($-α < C1', C2', M1', M2' < Cmax (Mmax)+α$). The ranges of C1', C2', M1', and M2' are $-64 < C1', C2', M1', M2' < 319$, because their quantization level is n=3 as described above.

$$C1' = C1 + eC1 \quad \text{(F401)}$$

$$C2' = C2 + eC2$$

$$M1' = M1 + eM1$$

$$M2' = M2 + eM2$$

Then, the distributedly quantizing portion 1205 obtains a sum total S of the corrected values using a formula F402 (S402). Here, in the case where S is out of a certain range ($-α < S < Cmax+Mmax+α$, $-64 < S < 574$, the range of the region A in FIG. 13), clipping is performed.

$$S = C1' + C2' + M1' + M2' \quad \text{(F402)}$$

Next, the distributedly quantizing portion 1205 quantizes the sum total S of the corrected values using a formula F403, (S403), and obtains a quantized value O.

$$O = \{(S+α) \times N\} / (Cmax + Mmax + α \times 2 + 1) \quad \text{(F403)}$$

FIG. 13 specifically shows the relationship between input values of input image data and output values of output image data in the quantization using the numerical formula F403. The input 1 is C1'+C2', and the input 2 is M1'+M2'.

As specific values, an example will be described in which the corrected value C1'=105, C2'=124, M1'=97, and M2'=60. The sum total S of the corrected values is 105+124+97+60=386. Since the quantization level is N=5, and Cmax=Mmax=255, the quantized value O can be obtained as follows. Here, the symbol (≈) indicates that values after the decimal point are excluded.

$$O=\{(386+64)\times 5\}/(255+255+64\times 2+1)=3.52\ldots\approx 3$$

Subsequently, the distributedly quantizing portion 1205 uses the following formula to distribute the quantized value O to cyan and magenta (S404), and determines quantized output values. The quantized output values for cyan and magenta are respectively taken as Cout and Mout.

$$C1out=\{O\times(C1'+\alpha)+(S+\alpha\times 2)/2\}/(S+\alpha\times 2)$$

$$C2out=\{O\times(C2'+\alpha)+(S+\alpha\times 2)/2\}/(S+\alpha\times 2)$$

$$M1out=\{O\times(M1'+\alpha)+(S+\alpha\times 2)/2\}/(S+\alpha\times 2)$$

$$M2out=O-C1out-C2out-M1out \quad (F404)$$

When the above-described quantized value O=3 is substituted into the formula, C1out, C2out, M1out, and M2out can be obtained as follows.

$$C1out=\{3\times(105+64)+(386+64\times 2)/2\}/(386+64\times 2)=1.48\ldots\approx 1$$

$$C2out=1.59\ldots\approx 1$$

$$M1out=1.43\ldots\approx 1$$

$$M2out=3-1-1-1=0$$

After the quantized value is obtained, the distributedly quantizing portion 1205 obtains errors corresponding to the obtained quantized value in the 1st and the 2nd passes for cyan and magenta, and diffuses the errors to neighboring pixels (S405). These processes are repeated until there is no further pixel that is to be processed. When the processes on one raster end in the above-described flow, similar processes are repeated on the next raster. The quantized data is converted by the print data-converting portion 1206 into a format that can be interpreted by a printer, and printing is performed when the print data is transmitted to the printer.

According to this embodiment, quantization with coordination between colors and recording scans can be performed using a simple calculation without a complicated comparison or a table having a large data size, and dots can be arranged so as to be uniformly dispersed from each other between cyan and magenta recording scans. Accordingly, the calculation amount and the memory size necessary for the processes can be reduced.

Here, in this embodiment, it is assumed that CMYK colors are used, but there is no limitation to this. Necessary colors may be further added or reduced according to the purpose in order to express a wide variety of colors or to simplify the processes. Furthermore, the present invention has been explained for an application to cyan and magenta, but there is no limitation on combination of colors, and various combinations can be selected, such as cyan and black, magenta and yellow, and so on.

Furthermore, the present invention can be applied not only to two colors but also to a larger number of colors. Furthermore, in this embodiment, the calculation formula for obtaining a quantized sum total for a sum total of corrected values is not limited to the formula described in this embodiment, and no calculation formulae have to be used. There are also methods using tables. Furthermore, the distribution method of the output values may use other calculation formulae. These aspects are as described using similar examples in the first to the third embodiments.

Furthermore, in this embodiment, the entire region of an input image is processed, but the present invention may be applied also to a partial region of the image. Furthermore, it is possible to switch whether or not to apply the present invention or to change the application degree depending on a given signal intensity (described in the fifth embodiment).

Furthermore, in this embodiment, the processes are performed on the raster level, but there is no limitation to this. The processes may be performed on the image level or on the pixel level according to the conditions, such as the performance of a printer, the memory amount or the calculation speed of a host computer, and the like.

Furthermore, the inkjet printer as the image-forming apparatus in this embodiment is shown merely as an example, and it will be appreciated that the present invention can be applied to various apparatus such as laser printers, as long as an image can be formed using a plurality of colors, by performing recording scans a plurality of times, or by performing recording scans a plurality of times using a plurality of colors.

Fifth Embodiment

This embodiment shows an example in which the present invention is applied to an inkjet printer. In the following description, constituent elements similar to those in the first embodiment (FIGS. 1 and 2) are denoted by the same reference numerals. It is assumed that the inkjet printer according to this embodiment uses CMYK colors, and quantization according to the present invention is performed on cyan and magenta. An independent quantization for each color is performed as in conventional examples on yellow and black.

Figure 10:
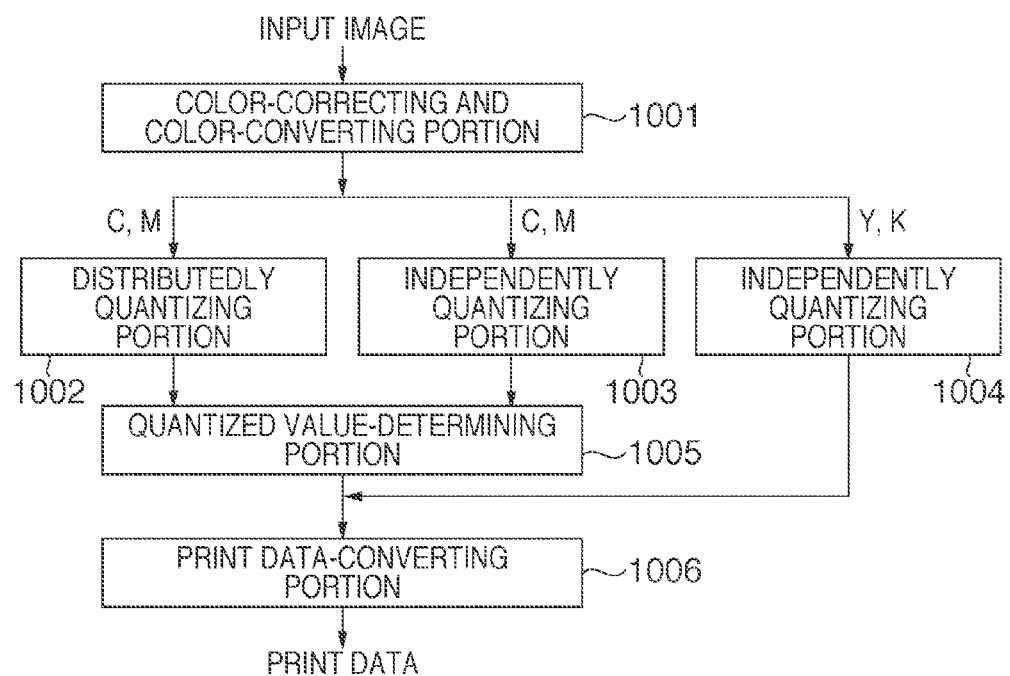
FIG. 10 is a diagram showing the overall processing procedure in the case where the application ratio in distribution quantization is changed according to cyan and magenta input values.

Input image data are received, processed by a color-correcting and color-converting portion 1001, a distributedly quantizing portion 1002, independently quantizing portions 1003 and 1004, a quantized value-determining portion 1005, and a print data-converting portion 1006, and then transmitted as output image data (print data) to a printer (see FIG. 10). That is to say, the image-processing apparatus according to this embodiment has the following configuration.

The color-correcting and color-converting portion 1001 (correcting unit) corrects an individual color component value of the pixel currently being processed, by adding a quantization error distributed to the individual color component of the position of the pixel currently being processed to the individual color component value constituting the data of the pixel currently being processed.

The distributedly quantizing portion 1002 (first quantizing unit) calculates a total of respective color component values of two or more predetermined color components (cyan and magenta in this embodiment) in the pixel currently being processed after correction by the color-correcting and color-converting portion 1001, and quantizes the calculated total to the number of gradations determined depending on the number of individual color components that are set to be quantized in a coordinated manner and the number of gradations M.

The independently quantizing portion 1003 (second quantizing unit) independently quantizes, to M gradations, color components (cyan and magenta) that are the same as the color components set to be quantized in a coordinated manner in the pixel currently being processed after correction by the color-correcting and color-converting portion 1001.

The independently quantizing portion 1004 (third quantizing unit) independently quantizes, to M gradations, a color component (yellow and black in this embodiment) excluding the color components quantized by the independently quantizing portion 1003, in the pixel currently being processed after correction by the color-correcting and color-converting portion 1001.

The quantized value-determining portion 1005 (dividing unit) performs division to provide color component values of the color components that are set to be quantized in a coordinated manner, based on the ratio between a maximum value that can be taken by the color component values, and a total of a value indicated by a result of the quantization performed by the distributedly quantizing portion 1002 and a value indicated by a result of the quantization performed by the independently quantizing portion 1003.

Differences between a quantized value of the individual color component set to be independently quantized by the independently quantizing portion 1004 and quantized values of the individual color components obtained by the division by the quantized value-determining portion 1005, and their unquantized values are distributed to unquantized pixel positions as quantization errors of the individual color components in the pixel currently being processed.

Overall Processing Procedure of the Image-Processing Apparatus

First, an image that is to be printed is input to the host computer 101 as an image-processing apparatus from the external storage apparatus 104, the input apparatus 103, or the like. Then, the host computer 101 inputs the input color or gray scale image to the color-correcting and color-converting portion 1001 according to a print image-processing program executed in the host computer. The color-correcting and color-converting portion 1001 performs color correction according to print settings, and converts RGB components ordinarily used in image data into CMYK components suitable for printing in a printer.

The distributedly quantizing portion 1002 quantizes cyan and magenta of the image converted into CMYK components. The quantization method in this embodiment is similar to that in the first embodiment, and, thus, a description thereof is omitted. The independently quantizing portion 1003 performs quantization independently for each color on cyan and magenta of the image converted into CMYK components using an ordinarily used conventional error diffusion method.

The independently quantizing portion 1004 performs quantization independently for each color on colors other than cyan and magenta, that is to say, yellow and black using an ordinarily used conventional error diffusion method. The quantized value-determining portion 1005 determines quantized values that are to be finally output, based on the quantized values obtained by the distributedly quantizing portion 1002 and the independently quantizing portion 1003.

Specifically, when cyan quantized values obtained by the distributedly quantizing portion 1002 and the independently quantizing portion 1003 are taken as Cor and Cod, and magenta quantized values as Mor and Mod, quantized values Cout and Mout that are to be finally output can be obtained using the following formula. Here, a sum total of cyan and magenta corrected values is taken as Si, and a maximum value that can be taken by the sum total of the cyan and magenta corrected values is taken as Smax.

$$Cout = Cor \times (1 - Si/Smax) + Cod \times Si/Smax$$

$$Mout = Mor \times (1 - Si/Smax) + Mod \times Si/Smax \quad (F501)$$

According to the Above-Described Formula, when the entire darkness of cyan and magenta is low, the ratio of a result of distribution error diffusion increases, and, thus, a quantization result that uniformly disperses dots is output, but, on the other hand, when the entire darkness of cyan and magenta is high, the ratio of a result of independent error diffusion increases, and, thus, the output result is similar to that in the case where quantization of cyan and quantization of magenta are performed without association. Since it is not that the quantization method is switched according to image input, but that the application degree is changed according to the ratio, unnaturalness in quantization results in the vicinity of a border at which quantization methods are switched can be suppressed, and the print image quality can be improved.

Here, the quantized data is converted by the print data-converting portion 1006 into a format that can be interpreted by a printer, and printing is performed when the print data is transmitted to the printer.

According to this embodiment, quantization with coordination between colors can be performed using a simple calculation without a complicated comparison or a table having a large data size, and cyan and magenta dots can be arranged so as to be uniformly dispersed from each other. Accordingly, the calculation amount and the memory size necessary for the processes can be reduced.

Here, in this embodiment, it is assumed that CMYK colors are used, but necessary colors may be further added or reduced according to the purpose in order to express a wide variety of colors or to simplify the processes. Furthermore, the present invention has been explained for an application to cyan and magenta, but there is no limitation on combination of colors, and various combinations can be selected, such as cyan and black, magenta and yellow, and so on. Furthermore, the present invention can be applied not only to two colors but also to a larger number of colors.

Furthermore, in this embodiment, a quantized value is obtained using the formula F501, but the calculation formula is no limitation to this. Furthermore, in this embodiment, the entire region of an input image is processed, but the present invention may be applied also to a partial region of the image.

Furthermore, in this embodiment, the processes are performed on the raster level, but the processes may be performed on the image level or on the pixel level according to the conditions, such as the performance of a printer, the memory amount or the calculation speed of a host computer, and the like.

Furthermore, the inkjet printer as the image-forming apparatus in this embodiment is shown merely as an example, and it will be appreciated that the present invention can be applied to various apparatus such as laser printers, as long as an image can be formed using a plurality of colors, by performing recording scans a plurality of times, or by performing recording scans a plurality of times using a plurality of colors.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-167263, filed Jul. 15, 2009, which is hereby incorporated by reference herein in its entirety.

What is claimed is:

1. An image-processing apparatus, comprising:
a corrected value calculating unit configured to calculate corrected values by adding error values diffused from a pixel neighboring a pixel currently being processed respectively to a plurality of input values corresponding to the pixel currently being processed;
a total value calculating unit configured to calculate a total value of all corrected values calculated by the corrected value calculating unit;
a quantizing unit configured to quantize the total value calculated by the total value calculating unit;
a distributing unit configured to calculate a plurality of output values corresponding to the plurality of input values by distributing the quantized value quantized by the quantizing unit according to a ratio between each of the corrected values calculated by the corrected value calculating unit and the total value calculated by the total value calculating unit; and
an adding unit configured to calculate respective difference values between the plurality of output values calculated by the distributing unit and a plurality of corrected values calculated by the corrected value calculating unit, and to add the calculated difference values to corrected values calculated by the corrected value calculating unit.

2. The image-processing apparatus according to claim 1, wherein the plurality of input values and the plurality of output values are pixel values for different color components of the pixel currently being processed.

3. The image-processing apparatus according to claim 1, wherein the plurality of input values and the plurality of output values are pixel values for performing an image formation process with recording scans performed a plurality of times on the pixel currently being processed.

4. An image-processing method in an image-processing apparatus, comprising:
a corrected value calculating step, in which a corrected value calculating unit provided in the image-processing apparatus calculates corrected values by adding error values diffused from a pixel neighboring a pixel currently being processed respectively to a plurality of input values corresponding to the pixel currently being processed;
a total value calculating step, in which a total value calculating unit provided in the image-processing apparatus calculates a total value of all corrected values calculated in the corrected value calculating step;
a quantizing step, in which a quantizing unit provided in the image-processing apparatus quantizes the total value calculated in the total value calculating step;
a distributing step, in which a distributing unit provided in the image-processing apparatus calculates a plurality of output values corresponding to the plurality of input values by distributing the quantized value quantized in the quantizing step according to a ratio between each of the corrected values calculated in the corrected value calculating step and the total value calculated in the total value calculating step; and
an adding step, in which an adding unit provided in the image-processing apparatus calculates respective difference values between the plurality of output values calculated in the distributing step and a plurality of corrected values calculated in the corrected value calculating step, and adds the calculated difference values to corrected values calculated in the corrected value calculating step.

5. A storage medium storing a program for causing a computer to function as the units of the image-processing apparatus according to claim 1.

6. An image-processing apparatus that quantizes input image data represented by individual color component values in N gradations into data represented by individual color component values in M gradations, where M is smaller than N, and distributes an error value of the individual color components generated at a time of quantization to unquantized pixel positions, comprising:
a correcting unit configured to correct individual color component values of a pixel currently being processed by adding a quantization error distributed to the individual color components of the position of the pixel currently being processed to the individual color component values constituting the data of the pixel currently being processed;
a first quantizing unit configured to independently quantize, to M gradations, individual color components that are set to be independently quantized in the pixel currently being processed after correction by the correcting unit;
a second quantizing unit configured to calculate a total of color component values of two or more color components that are set to be quantized in a coordinated manner in the pixel currently being processed after correction by the correcting unit, and to quantize the calculated total to the number of gradations determined depending on the number of individual color components that are set to be quantized in a coordinated manner and the number of gradations M;
a dividing unit configured to divide a value indicated by a result of the quantization performed by the second quantizing unit, in accordance with a ratio of the individual color component values that are set to be quantized in a coordinated manner, as quantized values of the individual color component values that are set to be quantized in a coordinated manner; and
a distributing unit configured to distribute differences between a quantized value of the individual color components set to be independently quantized by the first quantizing unit and quantized values of the individual color components obtained by the division by the dividing unit, and unquantized values thereof, to unquantized pixel positions as quantization errors of the individual color components in the pixel currently being processed.

7. The image-processing apparatus according to claim 6, wherein the distributing unit distributes the quantized value, by substituting a quantized value for each pixel with respect to the total of the corrected values obtained by the correcting unit, or a plurality of values with which a ratio of a corrected value can be calculated, into a high-dimensional function or a trigonometric function.

8. The image-processing apparatus according to claim 6, wherein at least a partial region of the input image data is quantized.

9. The image-processing apparatus according to claim 6, wherein whether or not to perform a quantization process on the input image data is switched using a predetermined signal intensity as a threshold value.

10. An image-processing apparatus that quantizes input image data represented by individual color component values in N gradations into data represented by individual color component values in M gradations, where M is smaller than N, and distributes an error value of the individual color components generated at a time of quantization to unquantized pixel positions, comprising:
- a correcting unit configured to correct individual color component values of a pixel currently being processed by adding a quantization error distributed to the individual color components of the position of the pixel currently being processed to the individual color component values constituting the data of the pixel currently being processed;
- a first quantizing unit configured to calculate a total of respective color component values of two or more predetermined color components in the pixel currently being processed after correction by the correcting unit, and to quantize the calculated total to the number of gradations determined depending on the number of individual color components that are set to be quantized in a coordinated manner and the number of gradations M;
- a second quantizing unit configured to independently quantize, to M gradations, color components that are the same as the color components set to be quantized in a coordinated manner in the pixel currently being processed after correction by the correcting unit;
- a third quantizing unit configured to independently quantize, to M gradations, a color component excluding the color components quantized by the second quantizing unit in the pixel currently being processed after correction by the correcting unit;
- a dividing unit configured to perform division to provide color component values of the color components that are set to be quantized in a coordinated manner, based on a ratio between a maximum value that can be taken by the color component values, and a total of a value indicated by a result of the quantization performed by the first quantizing unit and a value indicated by a result of the quantization performed by the second quantizing unit; and
- a distributing unit configured to distribute differences between a quantized value of the individual color component set to be independently quantized by the third quantizing unit and quantized values of the individual color components obtained by the division by the dividing unit, and unquantized values thereof, to unquantized pixel positions as quantization errors of the individual color components in the pixel currently being processed.

11. An image-processing apparatus that quantizes input image data having first image data that is to be quantized and second image data that is obtained by dividing a signal value of the first image data into a plurality of signal values, and represented by individual color component values in N gradations, into data represented by individual color component values in M gradations, where M is smaller than N, and distributes an error value of the individual color components generated at a time of quantization to unquantized pixel positions, comprising:
- a first calculating unit configured to calculate a corrected value for each pixel through addition of an error caused by a quantization process performed prior to that on a pixel currently being processed of the first image data;
- a second calculating unit configured to calculate corrected values, by adding all errors caused by a quantization process performed prior to that on a pixel currently being processed of the second image data, to pixel values of the pixel currently being processed;
- a third calculating unit configured to calculate a quantized value for each pixel based on the corrected values calculated by the second calculating unit; and
- a distributing unit configured to distribute the quantized value calculated by the third calculating unit to recording scans according to a ratio of a corrected value calculated by the first calculating unit with respect to a total of corrected values calculated by the first calculating unit.

* * * * *